(12) United States Patent
Takenaka

(10) Patent No.: US 9,893,616 B2
(45) Date of Patent: Feb. 13, 2018

(54) DC/DC CONVERTER

(71) Applicant: ROHM CO., LTD., Ukyo-Ku, Kyoto (JP)

(72) Inventor: Seiji Takenaka, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/415,210

(22) Filed: Jan. 25, 2017

(65) Prior Publication Data
US 2017/0214318 A1    Jul. 27, 2017

(30) Foreign Application Priority Data

Jan. 26, 2016 (JP) ................. 2016-012711

(51) Int. Cl.
| H02M 3/155 | (2006.01) |
| H02M 3/158 | (2006.01) |
| H02M 3/157 | (2006.01) |
| H02M 1/084 | (2006.01) |
| H02M 1/14 | (2006.01) |
| H02M 1/36 | (2007.01) |
| H02M 1/00 | (2006.01) |

(52) U.S. Cl.
CPC ........... H02M 3/157 (2013.01); H02M 1/084 (2013.01); H02M 1/14 (2013.01); H02M 1/36 (2013.01); *H02M 2001/0009* (2013.01)

(58) Field of Classification Search
CPC ........ H02M 3/10; H02M 3/155; H02M 3/156; H02M 3/157; H02M 3/158; H02M 1/084; H02M 1/14; H02M 1/36; H02M 2001/0009; H02M 2003/1566; G05F 1/56; G05F 1/59
USPC ........ 323/265, 268, 269, 271, 282–285, 351
See application file for complete search history.

(56) References Cited

U.S. PATENT DOCUMENTS

| 6,433,527 | B1 * | 8/2002 | Izadinia | ............. | H02M 3/1584 |
| | | | | | 323/300 |
| 9,685,858 | B2 * | 6/2017 | Fukushima | ........... | H02M 3/156 |
| 9,722,587 | B2 * | 8/2017 | Tsutsumi | ................. | H03K 5/08 |
| 9,762,187 | B2 * | 9/2017 | Ibusuki | ................... | H03F 3/183 |

(Continued)

*Primary Examiner* — Adolf Berhane
(74) *Attorney, Agent, or Firm* — Cantor Colburn LLP

(57) ABSTRACT

An error amplifier amplifies a difference between a feedback signal $V_{FB}$ that corresponds to an output voltage $V_{OUT}$ of a DC/DC converter and its target value $V_{REF}$, so as to generate an error signal $V_{ERR}$. A pulse width modulator for each channel is configured as a peak current mode modulator comprising a PWM comparator that compares a current detection signal $V_{IS}$ with the error signal $V_{ERR}$, and a logic circuit. When the number of enabled channels is switched, a soft shedding circuit selects at least one channel as a correction target channel. The soft shedding circuit generates a correction signal $V_{CORR}$ for each correction target channel, and superimposes each correction signal $V_{CORR}$ on at least one of two inputs of the corresponding PWM comparator.

17 Claims, 16 Drawing Sheets

(56) References Cited

U.S. PATENT DOCUMENTS

| | | | |
|---|---|---|---|
| 9,768,687 B2 * | 9/2017 | Matsuki | H02M 3/1588 |
| 2004/0012986 A1 * | 1/2004 | Riggio | H02M 1/4225 |
| | | | 363/26 |
| 2007/0257647 A1 * | 11/2007 | Chen | H02M 3/157 |
| | | | 323/282 |
| 2015/0015219 A1 * | 1/2015 | Ishino | H02M 3/1584 |
| | | | 323/271 |
| 2016/0118881 A1 * | 4/2016 | Schmitz | H02M 3/156 |
| | | | 323/271 |
| 2016/0351146 A1 * | 12/2016 | Takenaka | H02M 3/157 |
| 2017/0213510 A1 * | 7/2017 | Takenaka | G09G 3/3648 |

\* cited by examiner

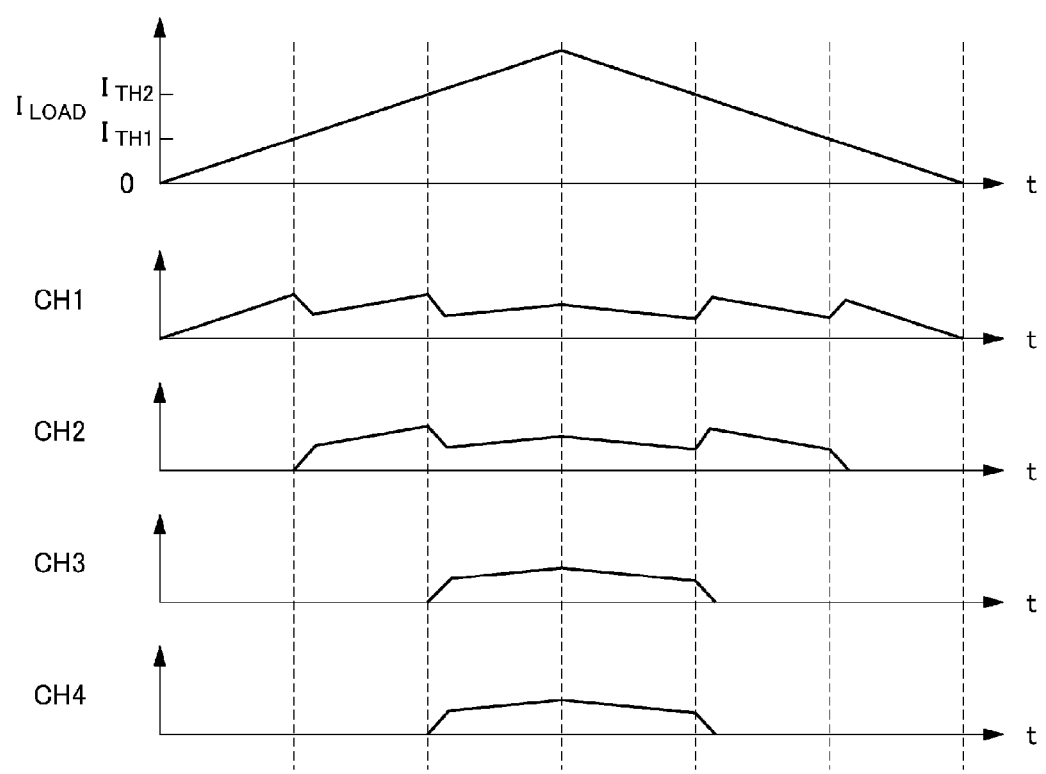

DC/DC CONVERTER

CROSS REFERENCE TO RELATED APPLICATIONS

The present invention claims priority under 35 U.S.C. § 119 to Japanese Application No. 2016-012711, filed Jan. 26, 2016, the entire content of which is incorporated herein by reference.

BACKGROUND OF THE INVENTION

1. Field of the Invention

The present invention relates to a DC/DC converter.

2. Description of the Related Art

Various kinds of electronic devices employ a DC/DC converter that converts a DC voltage having a given voltage value into a DC voltage having a different voltage value. In order to suppress ripple in the input current of the DC/DC converter, a multi-phase DC/DC converter is employed. FIG. 1 is a circuit diagram showing a multi-phase step-up (boost) DC/DC converter (which will simply be referred to as the "DC/DC converter") 900. The DC/DC converter 900 receives a DC input voltage $V_{IN}$ via an input line 902, and generates a stepped-up voltage $V_{OUT}$ at an output line 904. The DC/DC converter 900 is configured as an M-channel (M represents an integer of 2 or more) DC/DC converter. Each channel of the DC/DC converter 900 includes a switching transistor M1, an inductor L1, and a rectifier element D1. The M channels have a common output capacitor C1. It should be noted that, in the present specification, the channel number is represented by an appended suffix as necessary.

A controller 910 includes a common error amplifier 912 for the M channels and peak current mode pulse modulators 914_1 through 914_M provided to the respective channels, and drivers 922_1 through 922_M provided to the respective channels. The output voltage $V_{OUT}$ is divided by means of resistors R11 and R12 so as to generate a feedback voltage $V_{FB}$ that corresponds to the output voltage $V_{OUT}$. An error amplifier 912 amplifies the difference between the feedback signal $V_{FB}$ and a reference voltage $V_{REF}$ configured as a target value of the feedback signal $V_{FB}$, so as to generate an error signal $V_{ERR}$ that corresponds to the difference. The error signal $V_{ERR}$ is supplied to the pulse modulators 914_1 through 914_M respectively provided to the multiple channels.

Each pulse modulator 914 includes a PWM (pulse width modulation) comparator 916, a logic circuit 918, and a slope compensator 920. A current sensing resistor R1 is provided in order to detect a current that flows through a corresponding switching transistor M1 in an on period of the switching transistor M1. Specifically, the current sensing resistor R1 generates a current detection signal $V_{IS}$ that indicates the current thus detected. The slope compensator 920 superimposes a slope signal $V_{SLOPE}$ on the current detection signal $V_{IS}$. The PWM comparator 916 compares the current detection signal $V_{IS}$ with the error signal $V_{ERR}$. When the current detection signal $V_{IS}$ reaches the error signal $V_{ERR}$, the PWM comparator 916 asserts (sets to high level, for example) a reset signal (which will also be referred to as an "off signal") ICMP. In response to the reset signal ICMP, the logic circuit 918 switches a PWM signal $S_{PWM}$ to an off level (low level, for example) which instructs the switching transistor M1 to turn off. Furthermore, in response to a PWM clock (which will also be referred to as the "set signal" or "on signal") which is asserted for every predetermined period, the logic circuit 918 switches the PWM signal $S_{PWM}$ to an on level (high level, for example) which instructs the switching transistor M1 to turn on. The driver 922 drives the switching transistor M1 according to the PWM signal $S_{PWM}$.

Known examples of such a multi-channel DC/DC converter include an arrangement in which the number of channels to be operated is adjusted according to the load current (output current) $I_{LOAD}$ (shedding converter). FIG. 2 is a shedding operation of the DC/DC converter shown in FIG. 1. For ease of understanding, description will be made below regarding an arrangement in which M=4, i.e., regarding a four-channel converter 900. A pair of threshold values $I_{TH1}$ and $I_{TH2}$ are defined for the DC/DC converter 900. When $I_{LOAD} < I_{TH1}$, only the first channel CH1 is enabled (set to an active state or operating state). When $I_{TH1} < I_{LOAD} < I_{TH2}$, the first channel CH1 and the second channel CH2 are enabled. When $I_{TH2} < I_{LOAD}$, all the channels, i.e., the first channel CH1 through the fourth channel CH4 are enabled. A channel thus enabled will be referred to as an "enabled channel" hereafter. A channel thus disabled will be referred to as a "disabled channel" hereafter. FIG. 2 shows the operations of CH1 through CH4. In the drawing, the ideal coil current, i.e., the ideal switching duty ratio, of each channel is represented by a dashed line. The control operation as shown in FIG. 2 for switching between an enabled channel and a disabled channel in a logical manner will be referred to as "hard shedding". Such hard shedding has an advantage of providing high responsivity. However, as a result of investigating such hard shedding, the present inventor has recognized that hard shedding has a problem of poor stability of the output voltage $V_{OUT}$ as described below.

FIG. 2 also shows the actual coil current (actual switching duty ratio) for each of the channels CH1 through CH4, which are each represented by a dashed line. At the time point t0, the operation is switched from the single-channel operation to the two-channel operation. The change in the error signal $V_{ERR}$ is dull, as represented by the solid line, due to a response delay of the error amplifier 912. As a result, the first channel CH1 provides an amount of current having a waveform represented by the solid line. In this case, excess current, which is represented by the hatched area, occurs in the first channel CH1, which is supplied to the output capacitor C1.

Furthermore, the duty ratio of each channel is also determined according to the common error signal $V_{ERR}$. Accordingly, at the time point t0, the second channel CH2 supplies the same amount of current as that of the first channel CH1. This leads to a problem of supplying an amount of current larger than the ideal amount of current. That is to say, excess current, which is represented by the hatched area, also occurs in the channel CH2, which is also supplied to the output capacitor C1.

That is to say, when the load current $I_{LOAD}$ increases, the duty ratio of each channel becomes excessive. This leads to the generation of a surplus amount of coil current, leading to overshoot in the output voltage $V_{OUT}$.

Conversely, when the load current $I_{LOAD}$ decreases, the duty ratio of each channel becomes too small. This leads to the generation of an insufficient amount of coil current, leading to undershoot in the output voltage $V_{OUT}$. Such problems are not restricted to such a step-up DC/DC converter, but can occur in various kinds of converters such as step-down (Buck) DC/DC converters, step-up/step-down converters, etc.

SUMMARY OF THE INVENTION

The present invention has been made in order to solve such a problem. Accordingly, it is an exemplary purpose of an embodiment of the present invention to provide a multi-channel DC/DC converter and a control circuit for controlling the multi-channel DC/DC converter having an advantage of suppressing fluctuation of the output voltage $V_{OUT}$ involved in switching the number of enabled channels.

An embodiment of the present invention relates to a control circuit for a multi-channel DC/DC converter. The DC/DC converter comprises, for each channel, a switching transistor, an inductor, and a rectifier element. The control circuit comprises: an error amplifier structured to amplify a difference between a feedback signal that corresponds to an output signal of the DC/DC converter and a target value thereof so as to generate an error signal; multiple peak current mode pulse width modulators that respectively correspond to the multiple channels, each of which comprises a comparator structured to compare the error signal with a current detection signal that represents a current that flows through the corresponding switching transistor, and a logic circuit structured to switch a PWM (Pulse Width Modulation) signal to an off level according to an output of the comparator; multiple drivers that respectively correspond to the multiple channels, each of which is structured to drive the corresponding switching transistor according to the corresponding PWM signal; and a soft shedding circuit structured such that, when a number of enabled channels is switched, at least one channel is set to a correction target channel, a correction signal is generated for each correction target channel, and the correction signal thus generated is superimposed on at least one of two inputs of the corresponding comparator.

With such an embodiment, by correcting the duty ratio when the channel switching operation is performed, such an arrangement is capable of suppressing fluctuation of the output voltage, i.e., suppressing overshoot and undershoot in the output voltage.

Also, the soft shedding circuit may be structured to superimpose the corresponding correction signal on the error signal side input for each correction target channel. This provides improved stability of the output voltage without damaging the circuit stability.

Also, the soft shedding circuit may be structured such that, when the number of enabled channels is reduced, the correction signal is superimposed on the channels to be disabled after the channel switching, with a duty ratio that drops with time. This suppresses undershoot.

Also, the soft shedding circuit may be structured such that, when the number of enabled channels is increased, the correction signal is superimposed on the channels to be newly enabled, with a duty ratio that rises from zero. This suppresses overshoot.

Also, the control circuit may further comprise a current balance circuit structured to superimpose, for each of the multiple channels, a compensation signal that corresponds to a difference between the corresponding current detection signal and an average value of the current detection signals of the multiple channels on at least one of the two inputs of the corresponding comparator. Also, when at least one of the channels is set to a disabled state, the current balance circuit may operate assuming that a current flows through each of all the channels, so as to function as the soft shedding circuit. This suppresses fluctuation of the output voltage while maintaining the current balance between channels.

Also, when the current balance circuit is operated as the soft shedding circuit, the current detection signal to be supplied to the disabled channel is set to or otherwise replaced by a non-zero value that differs from an actual value.

With such an arrangement, the current balance circuit operates based on a virtual current balance as an ideal state. Such an arrangement is capable of adjusting the duty ratio of each channel toward its appropriate duty ratio.

A current balance circuit may be operated with a virtual average current value that is larger than an actual current average value. Such an arrangement allows the current balance circuit to operate as a soft shedding circuit.

Also, the current balance circuit may comprise multiple hold circuits that respectively correspond to the multiple channels, and each of which is structured to hold the corresponding current detection signal. Also, when the current balance circuit is operated as the soft shedding circuit, the hold value held by the hold circuit that corresponds to each disabled channel may be set to or replaced by a non-zero value.

Also, the current balance circuit may comprise: multiple individual current generating circuits that respectively correspond to the multiple channels, and each of which is structured to generate an individual current according to the corresponding current detection signal; a current averaging circuit structured to generate an average current that corresponds to an average of the individual currents of the multiple channels; multiple differential current generating circuits that respectively correspond to the multiple channels, and each of which is structured to generate a differential current between the corresponding individual current and the average current; and multiple superimposition circuits that respectively correspond to the multiple channels, and each of which is structured to generate an offset voltage as a compensation signal according to the corresponding differential current, and to superimpose the offset voltage thus generated on at least one of two inputs of the corresponding comparator.

Also, the multiple superimposition circuits may each comprise an offset resistor arranged such that a first end thereof is coupled to an output of the error amplifier and a second end thereof is coupled to an input of the corresponding comparator. Also, each superimposition circuit may be structured to supply the corresponding differential current to the second end of the offset resistor in the form of a source current or otherwise a sink current.

Also, the multiple individual current generating circuits may each comprise: a voltage/current conversion circuit structured to convert the corresponding current detection signal to a current signal; and a current distributing circuit structured to duplicate the current signal so as to provide two lines with duplicated currents, to supply one of the duplicated currents to the current averaging circuit via one line, and to supply the other of the duplicated currents to the corresponding differential current generating circuit via the other line.

Also, the current averaging circuit may comprise a current mirror circuit comprising an input transistor and output transistors. With the number of channels as M, the input transistor and each output transistor may be designed such that a size ratio between them is set to M:1. Also, the individual currents of the multiple channels may be input to the input transistor. Also, a current that flows through the output transistor may be output as the average current.

Another embodiment of the present invention also relates to a control circuit. The control circuit comprises: an error amplifier structured to amplify a difference between a feedback signal that corresponds to an output voltage of the DC/DC converter and a target value thereof so as to generate an error signal; multiple peak current mode pulse width modulators that respectively correspond to the multiple channels, each of which comprises a comparator structured to compare the error signal with a current detection signal that represents a current that flows through the corresponding switching transistor, and a logic circuit structured to switch a PWM (Pulse Width Modulation) signal to an off level according to an output of the comparator; multiple drivers that respectively correspond to the multiple channels, each of which is structured to drive the corresponding switching transistor according to the corresponding PWM signal; a multi-phase controller structured to switch a number of enabled channels; and a current balance circuit structured to superimpose, for each of the multiple channels, a compensation signal that corresponds to a difference between the corresponding current detection signal and an average value of the current detection signals of the multiple channels on at least one of the two inputs of the corresponding comparator. When at least one of the channels is set to a disabled state, the current balance circuit operates assuming that a current flows through each of all the channels.

With an embodiment, the control circuit may monolithically be integrated on a single semiconductor substrate. Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants.

Yet another embodiment of the present invention relates to a DC/DC converter. The DC/DC converter comprises any one of the aforementioned control circuits.

Yet another embodiment of the present invention relates to a system power supply. The system power supply may comprise the aforementioned DC/DC converter.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4 is a diagram showing a soft shedding operation of the DC/DC converter shown in FIG. 3;

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is coupled to the member B" includes a state in which the member A is indirectly coupled to the member B via another member that does not affect the electric connection therebetween, in addition to a state in which the member A is physically and directly coupled to the member B.

Similarly, the state represented by the phrase "the member C is provided between the member A and the member B" includes a state in which the member A is indirectly coupled to the member C, or the member B is indirectly coupled to the member C via another member that does not affect the electric connection therebetween, in addition to a state in which the member A is directly coupled to the member C, or the member B is directly coupled to the member C.

Also, the phrase "a signal A (voltage or current) corresponds to a signal B (voltage or current)" means the state in which the signal A has a correlation with the signal B. Specific examples of such a state include: (i) a state in which the signal A is the same as the signal B; (ii) a state in which the signal A is proportional to the signal B; (iii) a state in which the signal A is obtained by shifting the level of the signal B; (iv) a state in which the signal A is obtained by amplifying the signal B; (v) a state in which the signal A is obtained by inverting the signal B; (vi) a desired combination of the aforementioned states (i) through (v); and the like. The range of "corresponds" as described above is determined by the kinds of the signals A and B and the usage of the signals A and B, which can clearly be understood by those skilled in this art.

Figure 1:
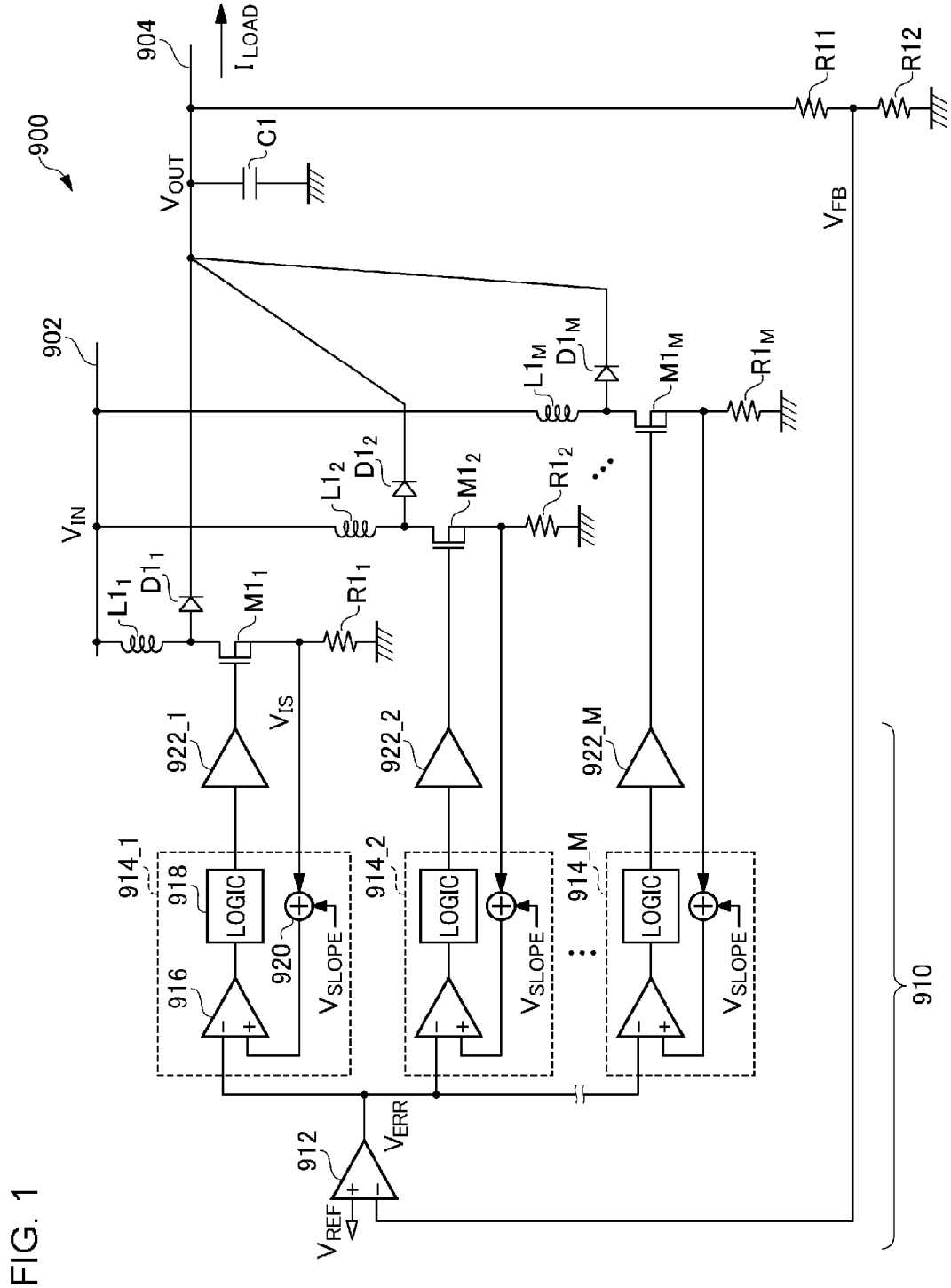
FIG. 1 is a circuit diagram showing a multi-phase step-up DC/DC converter.
Figure 2:
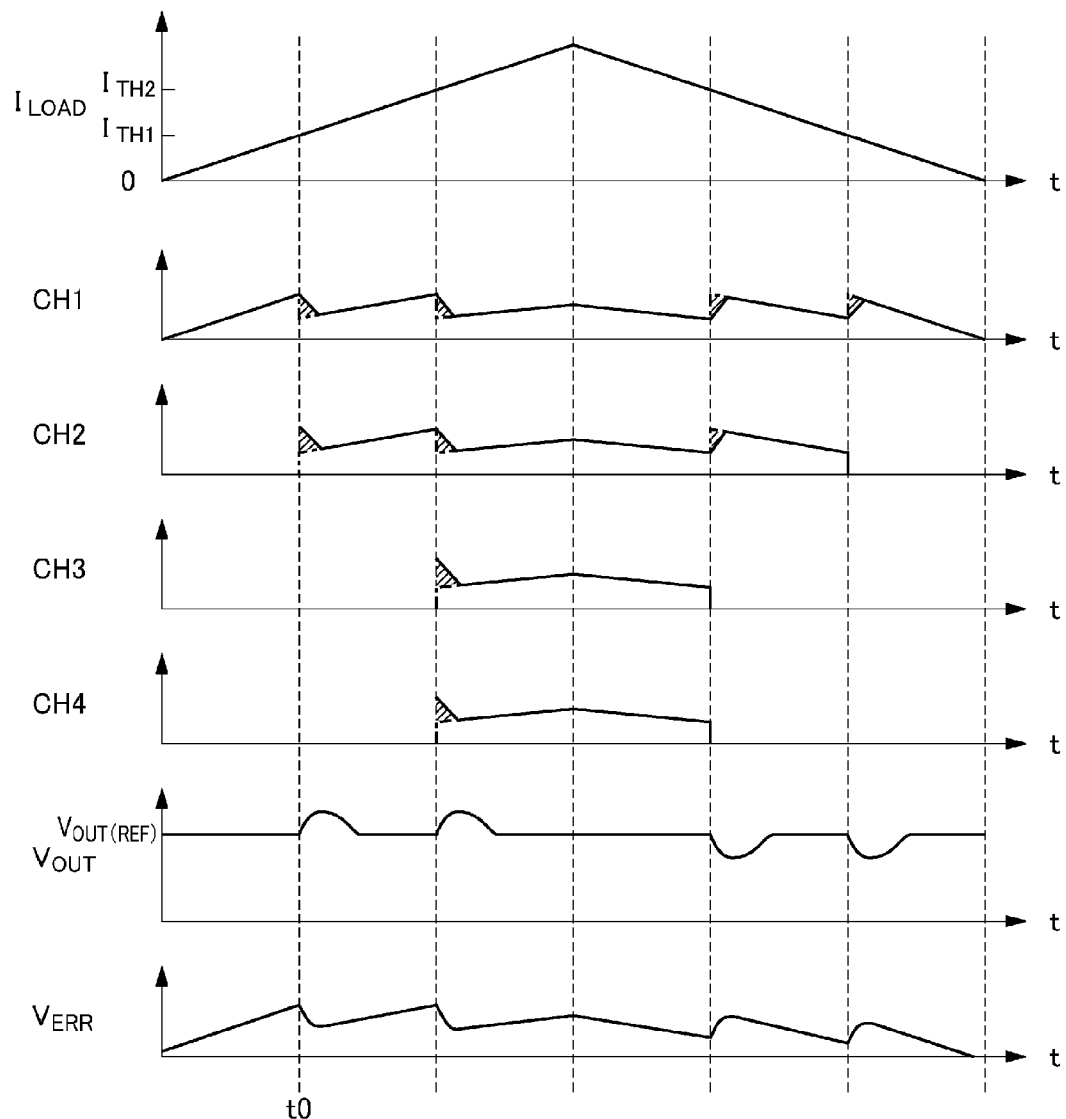
FIG. 2 is a diagram for explaining a shedding operation of the DC/DC converter shown in FIG. 1.
Figure 3:
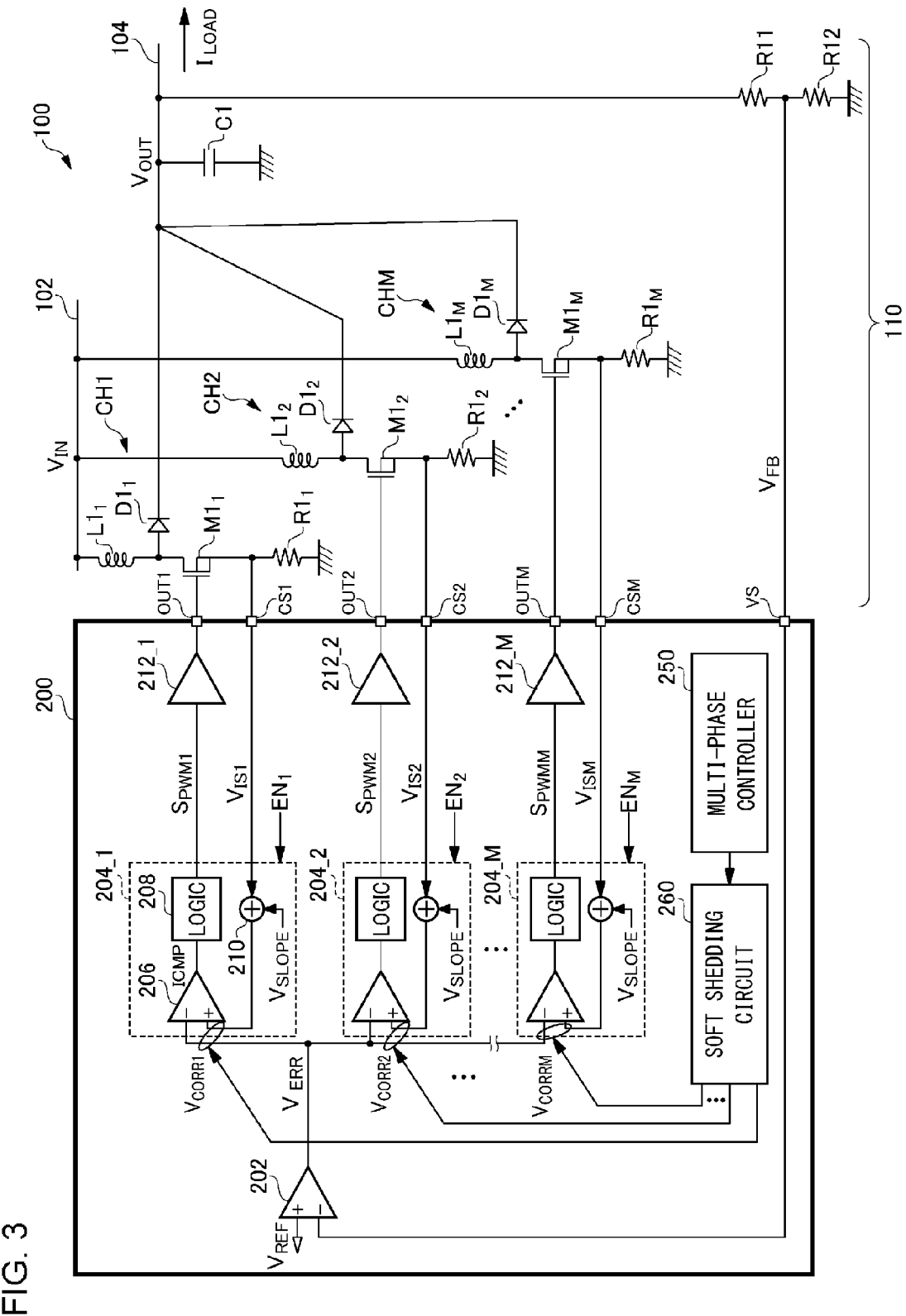
FIG. 3 is a circuit diagram showing a DC/DC converter including a control circuit according to an embodiment.

FIG. 3 is a circuit diagram showing a DC/DC converter 100 including a control circuit 200 according to an embodiment. The DC/DC converter 100 is configured as a multi-channel multi-phase step-up (boost) converter as with that shown in FIG. 1. The DC/DC converter 100 receives a DC input voltage $V_{IN}$ via its input line 102, and generates an output voltage $V_{OUT}$ at its output line 104. The DC/DC converter 100 is configured as an M-channel (M represents an integer of 2 or more) DC/DC converter. The number of channels may be designed as desired. Examples of the number of channels include two channels, three channels, four channels, six channels, eight channels, twelve channels, sixteen channels, and the like. That is to say, the number of channels may be determined according to the usage of the DC/DC converter 100.

The DC/DC converter 100 includes an output circuit 110 and a control circuit 200. The output circuit 110 includes M channels each including a switching transistor M1, an inductor L1, a rectifier element D1, and a current sensing resistor R1. Furthermore, the DC/DC converter 100 includes an output capacitor C1 and resistors R11 and R12 shared by the M channels. The current sensing resistor R1 provided for each channel is arranged between the corresponding switching transistor M1 and the ground. A voltage drop occurs across both ends of the current sensing resistor R1 in proportion to the current (i.e., coil current) that flows through the switching transistor M1 in the on period of the switching transistor M1. The voltage drop that occurs across the current sensing resistor R1 is input as the current detection signal $V_{IS}$ to the corresponding CS terminal.

The control circuit 200 is configured as a function IC (Integrated Circuit) integrated on a single semiconductor substrate. The control circuit 200 includes an output (OUT) terminal and a current detection (CS) terminal for each channel. Furthermore, the control circuit 200 includes a common voltage detection (VS) terminal shared by all the channels. A feedback signal $V_{FB}$ that corresponds to the output voltage $V_{OUT}$ is input to the VS terminal as a feedback signal. The control circuit 200 controls the switching transistors M1₁ through $M1_M$ respectively provided to the multiple channels CH1 through CHM such that the feedback signal $V_{FB}$ approaches the target value $V_{REF}$ thereof. It should be noted that the switching transistors M1 may be integrated together with the control circuit 200. Also, the current sensing resistors R1 may be integrated together with the control circuit 200.

The control circuit 200 includes an error amplifier 202, pulse width modulators 204_1 through 204_M, drivers 212_1 through 212_M, a multi-phase controller 250, and a soft shedding circuit 260. The error amplifier 202 amplifies the difference between the feedback signal $V_{FB}$ that corresponds to the output voltage $V_{OUT}$ of the DC/DC converter 100 and its target value $V_{REF}$, so as to generate an error signal $V_{ERR}$.

The multiple pulse width modulators 204_1 through 204_M correspond to the multiple channels, and each have a peak current mode configuration. Each pulse width modulator 204 includes a PWM comparator 206, a logic circuit 208, and a slope compensator 210. The PWM comparator 206 that corresponds to the i-th (1≤i≤M) channel compares the error signal $V_{ERR}$ with the current detection signal $V_{IS}$, which represents the current $I_{M1}$ that flows through the corresponding switching transistor M1. The logic circuit 208 switches a PWM signal to an off level (low level, for example) according to an output signal (reset signal) ICMP output from the PWM comparator 206. Furthermore, the logic circuit 208 switches the PWM signal to an on level in synchronization with a PWM clock (set signal) which is asserted for every PWM period. The slope compensator 210 superimposes a slope voltage $V_{SLOPE}$ on either the current detection signal $V_{IS}$ or the error signal $V_{ERR}$.

The multiple drivers 212_1 through 212_M correspond to the multiple channels CH1 through CHM. The i-th driver 212_i drives the corresponding switching transistor M1_i according to the PWM signal $S_{PWM}$ received from the corresponding pulse width modulator 204_i.

The multi-phase controller 250 switches the enabled channels from among the multiple channels CH1 through CHM according to the state of the DC/DC converter 100 or the state of the load. For example, the multi-phase controller 250 controls the number of enabled channels and the operation phase based on the load current $I_{LOAD}$ applied to the DC/DC converter 100. Specifically, the multi-phase controller 250 raises the number of enabled channels according to an increase in the load current $I_{LOAD}$. The multi-phase controller 250 may monitor the load current $I_{LOAD}$. Also, the multi-phase controller 250 may adjust the number of enabled channels according to a control signal received from an external microcomputer or otherwise a control signal received from a load coupled to the output line 104.

Before the multi-phase controller 250 switches the number of enabled channels, the soft shedding circuit 260 selects at least one channel as a correction channel. Subsequently, the soft shedding circuit 260 superimposes a correction signal $V_{CORR}$ on at least one of two inputs (non-inverting input terminal and inverting input terminal) of the PWM comparator 206 that corresponds to the correction channel.

Preferably, the soft shedding circuit 260 superimposes the correction signal $V_{CORR}$ on the input on the error signal $V_{ERR}$ side (inverting input terminal side of the PWM comparator 206 shown in FIG. 3) of the correction channel selected from among the multiple channels CH1 through CHM. That is to say, the PWM comparator 206_i compares the current detection signal $V_{ISi}$ with the error signal $V_{ERRi}$ on which the correction signal $V_{CORRi}$ has been superimposed. When $V_{ISi} > V_{ERRi}$, the ICMP signal is asserted.

The above is the configuration of the control circuit 200 and the configuration of the DC/DC converter 100 including the control circuit 200. Next, description will be made regarding the operation thereof. It should be noted that the vertical axis and the horizontal axis shown in the waveform diagrams and the time charts in the present specification are expanded or reduced as appropriate for ease of understanding. Also, each waveform shown in the drawing is simplified or exaggerated for emphasis for ease of understanding. FIG. 4 is a diagram for explaining the soft shedding operation of the DC/DC converter 100 shown in FIG. 3. When the number of enabled channels is reduced, the soft shedding circuit 260 selects a channel to be disabled after the channel switching, and superimposes the correction signal $V_{CORR}$ on the channel thus selected such that its duty ratio decreases with time. Furthermore, when the number of enabled channels is increased, the soft shedding circuit 260 selects a new channel to be enabled, and superimposes the correction signal $V_{CORR}$ on the channel thus selected such that its duty ratio increases from zero.

Figure 5A:
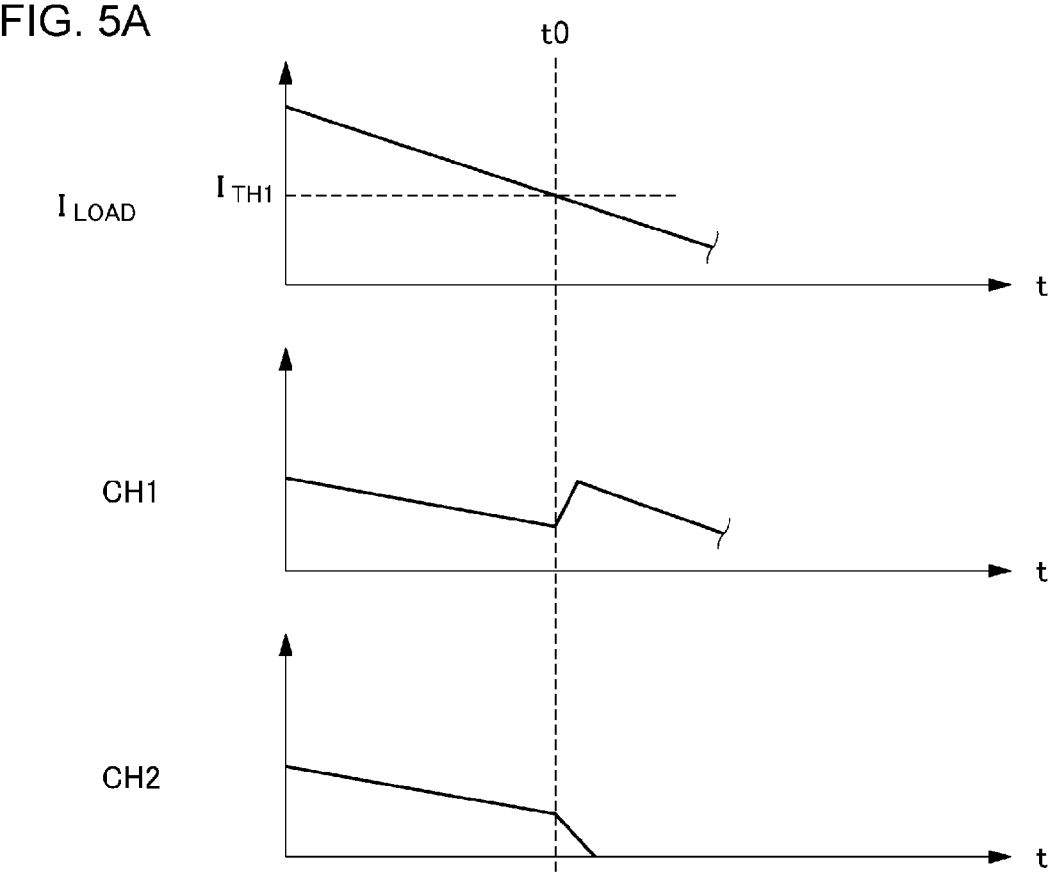
FIGS. 5A and 5B are waveform diagrams each showing an operation of the DC/DC converter shown in FIG. 3 when the number of enabled channels is reduced.
Figure 5B:
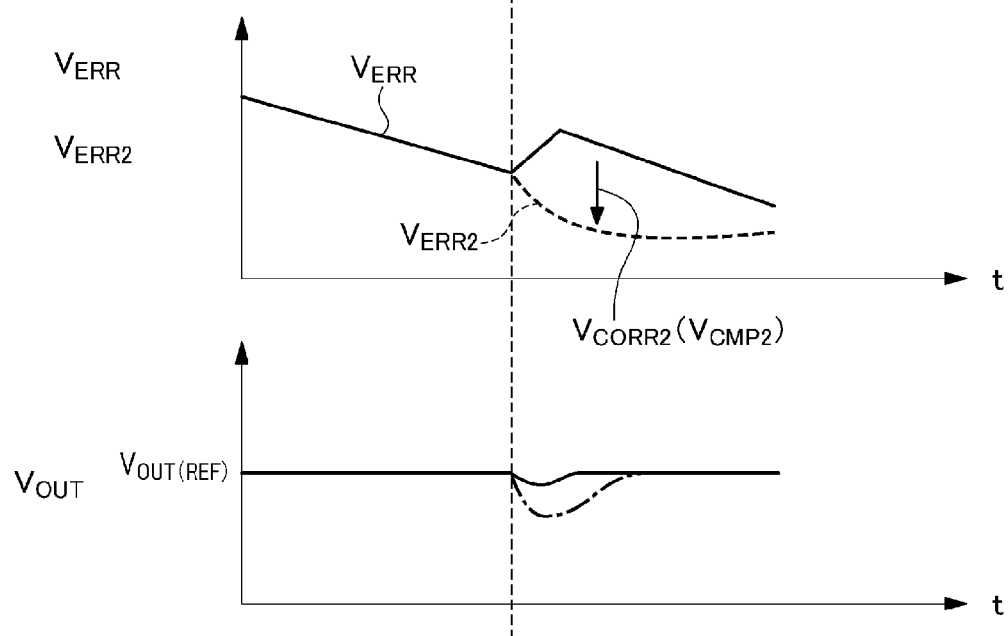

FIGS. 5A and 5B are operation waveform diagrams each showing the operation of the DC/DC converter 100 shown in FIG. 3 when the number of enabled channels is reduced. There is a difference in the time scale of the horizontal axis between FIG. 5A and FIG. 5B. For ease of understanding and simplicity of description, description will be made regarding a case in which the number of enabled channels is switched from two channels to one channel. Before the time point t0, the first channel CH1 and the second channel CH2 are set to the enabled state. When the load current $I_{LOAD}$ becomes smaller than the threshold value $I_{TH1}$ at the time point t0, the second channel CH2 is switched to the disabled state. In the drawing, the graphs CH1 and CH2 show the current supply capacity of the corresponding channel.

The soft shedding circuit 260 superimposes the correction signal $V_{CORR2}$ on the error signal $V_{ERR}$ of the second channel CH2. This shifts the effective value of the error signal $V_{ERR2}$ of the second channel CH2, thereby correcting the switching duty ratio. Specifically, the correction signal $V_{CORR2}$ is superimposed on the channel CH2, which is to be disabled after the channel switching, such that the duty ratio is reduced with time. Such an arrangement is capable of suppressing undershoot in the output voltage $V_{OUT}$ as compared with an arrangement configured to perform a hard shedding operation in which the channel CH2 is turned off at the time point t0.

It should be noted that such a correction signal $V_{CORR1}$ may also be superimposed on the error signal $V_{ERR}$ that corresponds to the first channel CH1 so as to shift the effective value of the corresponding error signal $V_{ERR}$, thereby correcting the corresponding switching duty ratio.

It should be noted that, in a case in which the error signal $V_{ERR1}$ on which the correction signal $V_{CORR1}$ has been superimposed and the error signal $V_{ERR2}$ on which the correction signal $V_{CORR2}$ has been superimposed have excessively high responsivity, this leads to a problem in that the system enters an unstable state. In order to solve such a problem, the correction signals $V_{CORR1}$ and $V_{CORR2}$ are preferably superimposed on the respective error signals with an appropriate time constant. In order to solve such a problem, the correction signal $V_{CORR1}$ or $V_{CORR2}$ is preferably superimposed on the error signal with an appropriate time constant.

Figure 6A:
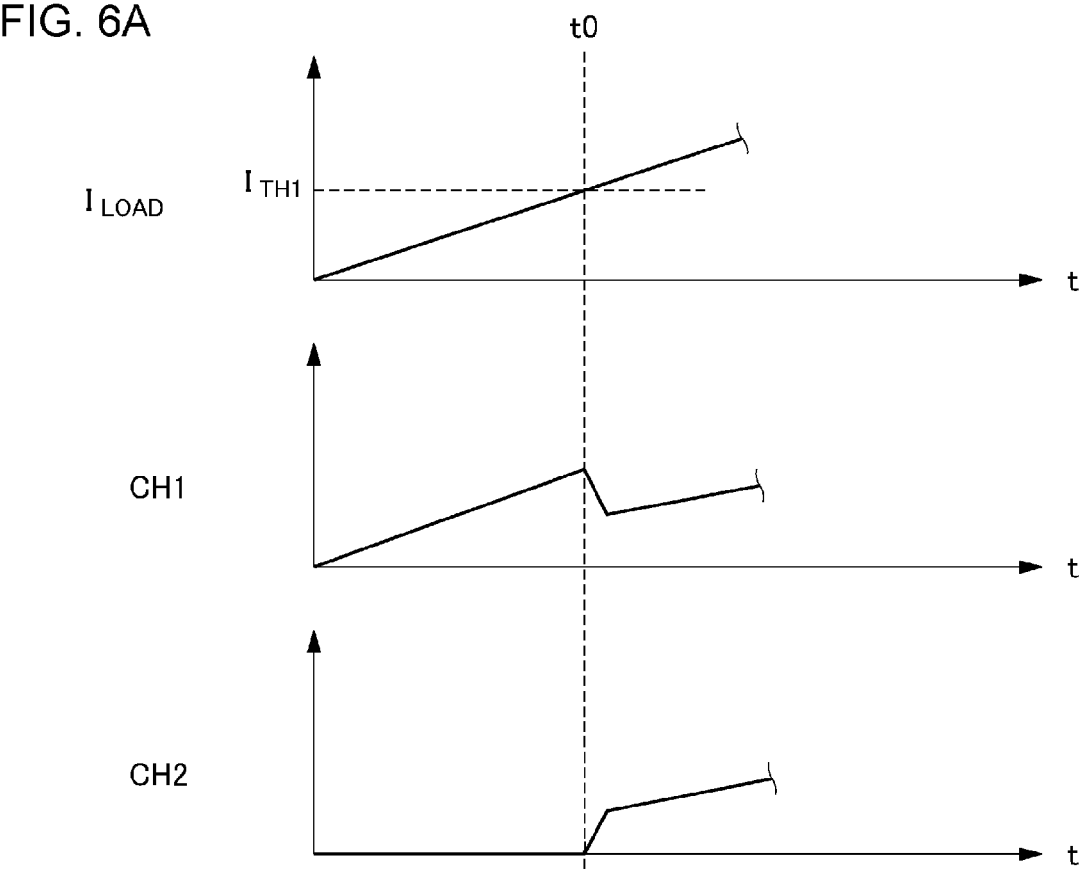
FIGS. 6A and 6B are waveform diagrams each showing an operation of the DC/DC converter shown in FIG. 3 when the number of enabled channels is increased.
Figure 6B:
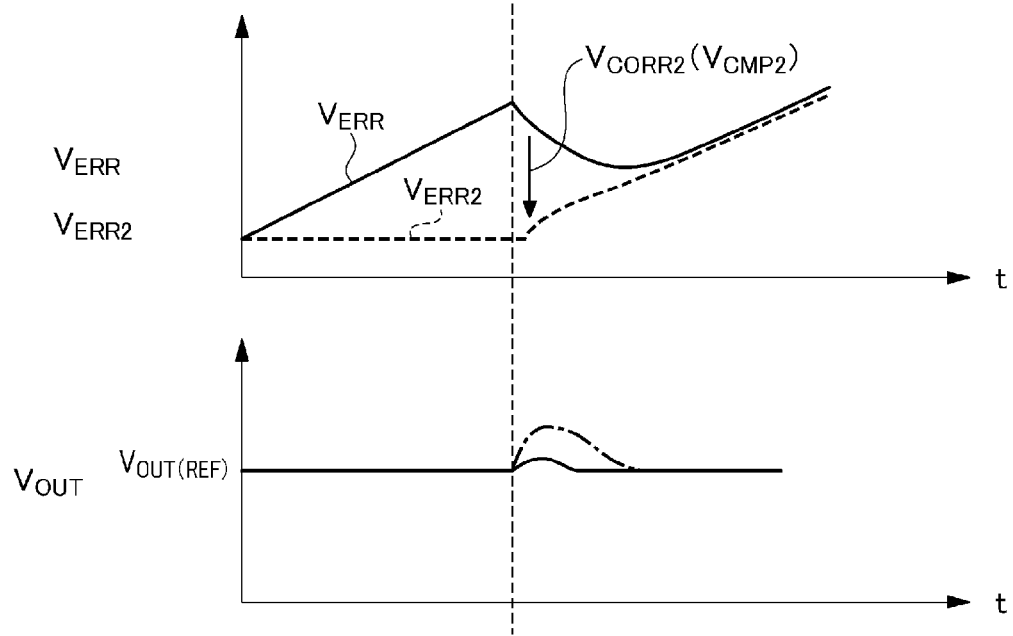

FIGS. 6A and 6B are operation waveform diagrams each showing the operation of the DC/DC converter 100 shown in FIG. 3 when the number of enabled channels is increased. There is a difference in the time scale of the horizontal axis between FIG. 6A and FIG. 6B. Before the time point t0, only the first channel CH1 is set to the enabled state. When the load current $I_{LOAD}$ becomes larger than the threshold value $I_{TH1}$ at the time point t0, the second channel CH2 is also switched to the enabled state. In such an operation in which the number of enabled channels is increased, the effective value of the error signal $V_{ERR2}$ of the second channel CH2 is shifted so as to correct the duty ratio of the switching operation.

Specifically, the correction signal $V_{CORR2}$ is superimposed on the channel CH2, which is to be newly enabled, such that the duty ratio is increased from zero. Such an arrangement is capable of suppressing overshoot in the output voltage $V_{OUT}$ as compared with an arrangement configured to perform a hard shedding operation in which the channel CH2 is turned on at the time point t0 with a duty ratio that corresponds to the error signal $V_{ERR}$.

It should be noted that such a correction signal $V_{CORR1}$ may also be superimposed on the error signal $V_{ERR}$ that corresponds to the first channel CH1 so as to shift the effective value of the corresponding error signal $V_{ERR}$, thereby correcting the corresponding switching duty ratio.

The above are the operations of the DC/DC converter 100 and the control circuit 200 for controlling the DC/DC converter 100. In addition to the feedback control operation of the error amplifier, the control circuit 200 further includes the soft shedding circuit 260 having a higher operating rate than that of the error amplifier. The soft shedding circuit 260 superimposes the correction signal $V_{CORR}$ on the input of the PWM comparator 206 so as to correct the duty ratio, i.e., the current supply capacity, for each channel, thereby suppressing overshoot and undershoot.

It should be noted that the channel to be corrected is not restricted in particular. That is to say, the channel to be corrected may preferably be selected so as to suppress overshoot and undershoot. Also, the value of the correction signal $V_{CORR}$ to be supplied to the correction channel may preferably be designed beforehand so as to reduce overshoot and undershoot. Alternatively, as with a control circuit 200a described later with reference to FIG. 7, the value of the correction signal $V_{CORR}$ may be automatically changed.

It should be noted that an arrangement in which the correction signal $V_{CORR}$ is superimposed on the error signal $V_{ERR}$ on the inverting input terminal (−) side of the PWM comparator 206 is equivalent to an arrangement in which the inversion of the correction signal $V_{COMP}$ is superimposed on the current detection signal $V_{IS}$ on the non-inverting input terminal (+) side of the PWM comparator 206. Accordingly, either arrangement may be employed. The addition of the soft shedding circuit 260 means that a new control system is employed, which has a non-negligible effect on the stability of the operation of the DC/DC converter 100. As a result of investigation by the present inventor, in some circuit cases, it has been confirmed that the former arrangement (in which the correction signal $V_{COMP}$ is superimposed on the error signal $V_{ERR}$) provides the system with improved stability. Accordingly, by superimposing the correction signal $V_{CORR}$ on the error signal $V_{ERR}$ side, such an arrangement is capable of suppressing overshoot and undershoot without damaging the system stability. It should be noted that such an arrangement in which the correction signal $V_{CORR}$ is superimposed on the current detection signal $V_{IS}$ side does not necessarily lead to degradation in the system stability. In a case in which such an arrangement does not lead to a problem of degradation in the system stability, the correction signal $V_{CORR}$ may be superimposed on the current detection signal $V_{IS}$ side.

The present invention encompasses various kinds of apparatuses and circuits that can be regarded as a block configuration or a circuit configuration shown in FIG. 3, or otherwise that can be derived from the aforementioned description. That is to say, the present invention is not restricted to a specific circuit configuration. More specific description will be made below regarding an example configuration for clarification and ease of understanding of the essence of the present invention and the circuit operation. That is to say, the following description is by no means intended to restrict the technical scope of the present invention.

Figure 7:
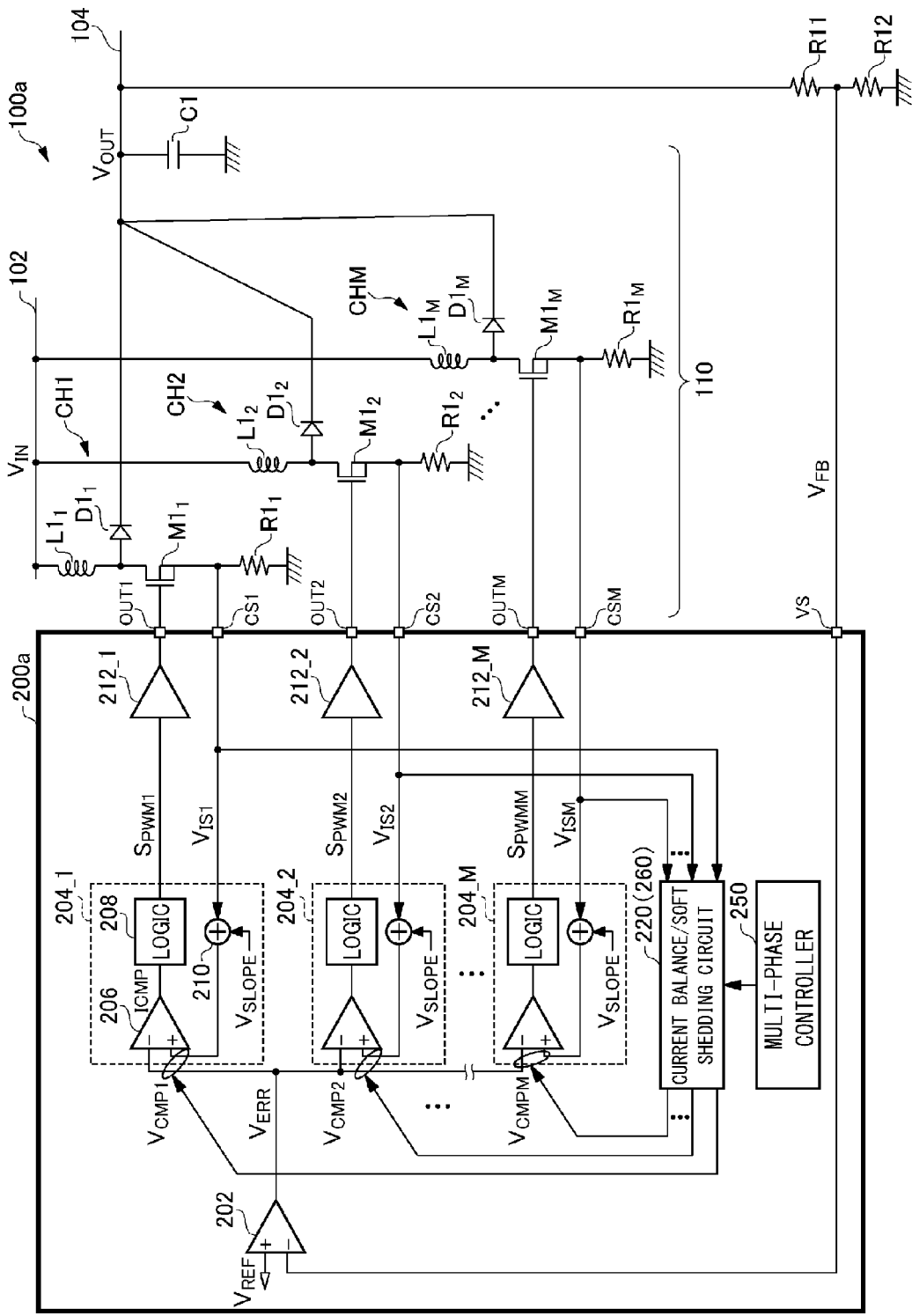
FIG. 7 is a circuit diagram showing an example configuration of the control circuit.

FIG. 7 is a circuit diagram showing an example configuration (200a) of the control circuit 200. The control circuit 200a includes a current balance circuit 220 that also functions as the soft shedding circuit 260. The current balance circuit 220 generates a compensation signal $V_{CMPi}$ that corresponds to the difference between the corresponding current detection signal $V_{ISi}$ and an average value $V_{AVE}$ of the current detection signals $V_{ISi}$ through $V_{ISM}$ for the multiple channels CH1 through CHM. Furthermore, the current balance circuit 220 superimposes the compensation signal $V_{CMPi}$ thus generated on at least one from among the two inputs of the corresponding PWM comparator 206_i.

Preferably, the current balance circuit 220 superimposes each of the correction signals $V_{CMP1}$ through $V_{CMPM}$ on the error signal $V_{ERR}$ side input (inverting input terminal side of the PWM comparator 206 shown in FIG. 3) of the corresponding channel from among the multiple channels CH1 through CHM. That is to say, the PWM comparator 206_i compares the current detection signal $V_{ISi}$ with the error signal $V_{ERRi}$ on which the compensation signal $v_{CMPi}$ has been superimposed. When $V_{ISi} > V_{ERRi}$, the PWM comparator 206 asserts the ICMP signal.

For example, the current balance circuit 220 may acquire the peaks by sampling for the current detection signals $V_{IS1}$ through $V_{ISM}$ respectively detected at the multiple channels CH1 through CHM. Furthermore, the current balance circuit 220 may generate the compensation signals $V_{CMP1}$ through $V_{CMPM}$ based on the current detection signals $V_{IS1}'$ through $V_{ISM}'$ thus sampled. The timing at which the current detection signal $V_{ISi}$ becomes the peak value at the i-th channel matches the timing at which the corresponding switching transistor M1 is turned off, i.e., the timing at which the ICMP signal is asserted. Accordingly, by configuring the current balance circuit 220 to hold the peak values, such an arrangement allows the ICMP signal or the PWM signal to be used as a timing signal. This provides the control operation in a simple manner.

Figure 8A:
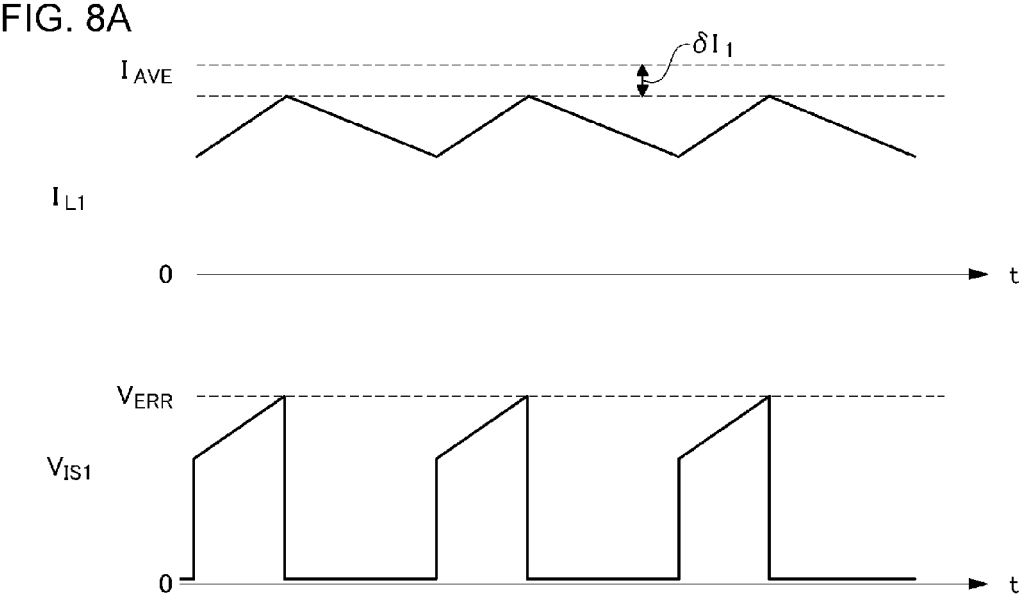
FIGS. 8A and 8B are operation waveform diagrams each showing the operation of the DC/DC converter shown in FIG. 3.
Figure 8B:
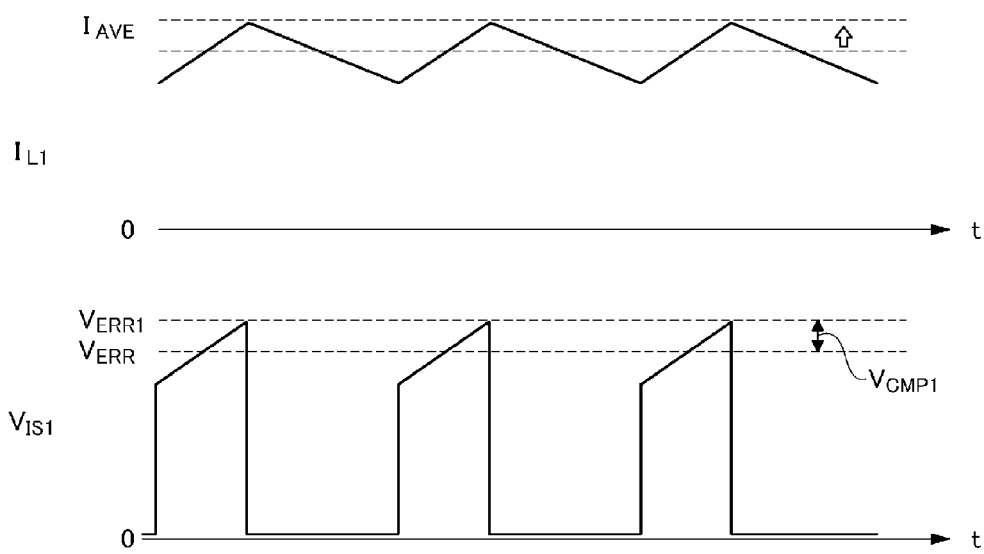

Description will be made regarding the basic operation of the current balance circuit 220. FIGS. 8A and 8B are operation waveform diagrams each showing the operation of the DC/DC converter 100 shown in FIG. 3. FIG. 8A shows the waveform when the current balance circuit 220 does not operate. Directing attention to the first channel CH1, description will be made regarding a case in which the peak value of the coil current $I_{L1}$ is smaller by a deviation $\delta I_1$ than the average value $I_{PEAKAVE}$ of the coil currents detected for all the channels, as shown in FIG. 8A.

Description will be made regarding the operation of the current balance circuit 220 with reference to FIG. 8B. The current balance circuit 220 generates the compensation signal $V_{CMP1}$ that corresponds to the deviation $\delta I_1$, and superimposes the compensation signal $V_{CMP1}$ thus generated on the error signal $V_{ERR}$. The PWM comparator 206 compares the current detection signal $V_{IS1}$ with the error signal $V_{ERR1}$ thus corrected. When the relation $V_{IS1} > V_{ERR1}$ holds true, the ICMP signal is asserted, which turns off the switching transistor M1. The current balance circuit 220 performs the same correction for the other channels CH2 through CHM. The above is the operation of the control circuit 200.

With such a control circuit 200a, the current balance circuit 220 performs the correction operation such that the peak value of the coil current $I_{Li}$ of each channel CHi approaches the peak average $I_{PEAKAVE}$ of the coil currents $I_{L1}$ through $I_{LM}$ of all the channels CH1 through CHM. Thus, such an operation corrects the coil currents of all the channels such that their peaks match each other. This provides improved current balance among all the channels.

It should be noted that an arrangement in which the compensation signal $V_{CMP}$ is superimposed on the error signal $V_{ERR}$ on the inverting input terminal (−) side of the PWM comparator 206 is equivalent to an arrangement in which the inversion of the compensation signal $V_{CMP}$ is superimposed on the current detection signal $V_{IS}$ on the non-inverting input terminal (+) side of the PWM comparator 206. Accordingly, either arrangement may be employed. The addition of the current balance circuit 220 means that a new control system is employed, which has a non-negligible effect on the stability of the operation of the DC/DC converter 100. As a result of investigation by the present inventor, in some circuit cases, it has been confirmed that the former arrangement (in which the compensation signal $V_{CMP}$ is superimposed on the error signal $V_{ERR}$) provides the system with improved stability. Accordingly, by superimposing the compensation signal $V_{CMP}$ on the error signal $V_{ERR}$ side, such an arrangement provides an improved current balance without damaging the system stability. It should be noted that such an arrangement in which the compensation signal $V_{CMP}$ is superimposed on the current detection signal $V_{IS}$ side does not necessarily lead to degradation in the system stability. In a case in which such an arrangement does not lead to a problem of degradation in the system stability, the compensation signal $V_{CMP}$ may be superimposed on the current detection signal $V_{IS}$ side.

In the control circuit 200a shown in FIG. 7, the current balance circuit 220 also functions as the soft shedding circuit 260. Furthermore, the compensation signal $V_{CMP}$ also functions as the correction signal $V_{CORR}$. Description will be made regarding the function and the operation of the current balance circuit 220 that also functions as the soft shedding circuit 260.

The current balance circuit 220 operates assuming that a virtual current also flows through each disabled channel. First, description will be made regarding an arrangement in which M=2. That is to say, in a single-channel operation, the actual current flow is represented by the following Expressions.

$$I_{M1}=I_{LOAD}$$

$$I_{M2}=0$$

The current balance circuit 220 is operated assuming that the relations $I_{M1}=I_{LOAD}$, and $I_{M2}=K \times I_{LOAD}$ hold true. Here, K is a value that is larger than 1. In this case, the average current is represented by the following Expression.

$$I_{AVE}=(1+K)/2 \times I_{LOAD}.$$

In a case in which K>1, it is assumed that the individual current $I_{M1}$ ($=I_{LOAD}$) of the first channel CH1 is smaller than the average current $I_{AVE}$. Accordingly, the correction signal $V_{CMP1}$ is generated such that the individual current $I_{M1}$ approaches the average current, i.e., such that the duty ratio is raised. On the other hand, it is assumed that the individual current $I_{M2}$ ($=K \times I_{LOAD}$) of the second channel CH2 is larger than the average current $I_{AVE}$. Accordingly, the correction signal $V_{CMP2}$ is generated such that the individual current of the second channel CH2 approaches the average current, i.e., such that the duty ratio is reduced.

In a case in which M=4, the operation may preferably be performed as follows. In the single-channel operation, the actual current flow is represented by the following Expressions.

$$I_{M1}=I_{LOAD}$$

$$I_{M2}=0$$

$$I_{M3}=0$$

$$I_{M4}=0$$

The current balance circuit 220 is operated assuming that the relations $I_{M1}=I_{LOAD}$, $I_{M2}=K \times I_{LOAD}$, $I_{M3}=K \times I_{LOAD}$, and $I_{M4}=K \times I_{LOAD}$ hold true. Here, K represents a value that is larger than 1. In this case, the average current is represented by the following Expression.

$$I_{AVE}=(1+3K)/4 \times I_{LOAD}.$$

With such an arrangement, it is assumed that the individual current $I_{M1}$ ($=I_{LOAD}$) of the first channel CH1 is smaller than the average current $I_{AVE}$. Accordingly, the correction signal $V_{CMP1}$ is generated such that the individual current $I_{M1}$ approaches the average current, i.e., such that the duty ratio of this channel is raised. On the other hand, it is assumed that the individual current ($=K \times I_{LOAD}$) of each of the second channel CH2 through the fourth channel CH4 is larger than the average current $I_{AVE}$. Accordingly, the correction signal $V_{CMP}$ is generated for each of the second channel CH2 through the fourth channel CH4 such that the individual current approaches the average current, i.e., such that the duty ratio is reduced.

In the two-channel operation, the actual current flow is represented by the following Expressions.

$$I_{M1}=I_{LOAD}/2$$

$$I_{M2}=I_{LOAD}/2$$

$$I_{M3}=0$$

$$I_{M4}=0$$

As an example, the current balance circuit 220 is operated assuming that the relations $I_{M1}=I_{LOAD}/2$, $I_{M2}=I_{LOAD}/2$, $I_{M3}=K\times I_{LOAD}/2$, and $I_{M4}=K\times I_{LOAD}/2$ hold true. Here, K represents a value that is larger than 1. In this case, the average current is represented by the following Expression.

$$I_{AVE}=(1+K)/4\times I_{LOAD}.$$

With such an arrangement, it is assumed that that each individual current $I_M$ ($=I_{LOAD}/2$) of the first channel CH1 and the second channel CH2 is smaller than the average current $I_{AVE}$. Accordingly, the correction signal $V_{CMP}$ is generated for the first channel CH1 and the second channel CH2 such that each individual current approaches the average current, i.e., such that the duty ratio of each channel is raised. Furthermore, it is assumed that that each individual current ($=K\times I_{LOAD}/2$) of the third channel CH3 and the fourth channel CH4 is larger than the average current $I_{AVE}$. Accordingly, the correction signal $V_{CMP}$ is generated for the third channel CH3 and the fourth channel CH4 such that each individual current approaches the average current, i.e., such that the duty ratio of each channel is reduced.

Figure 9:
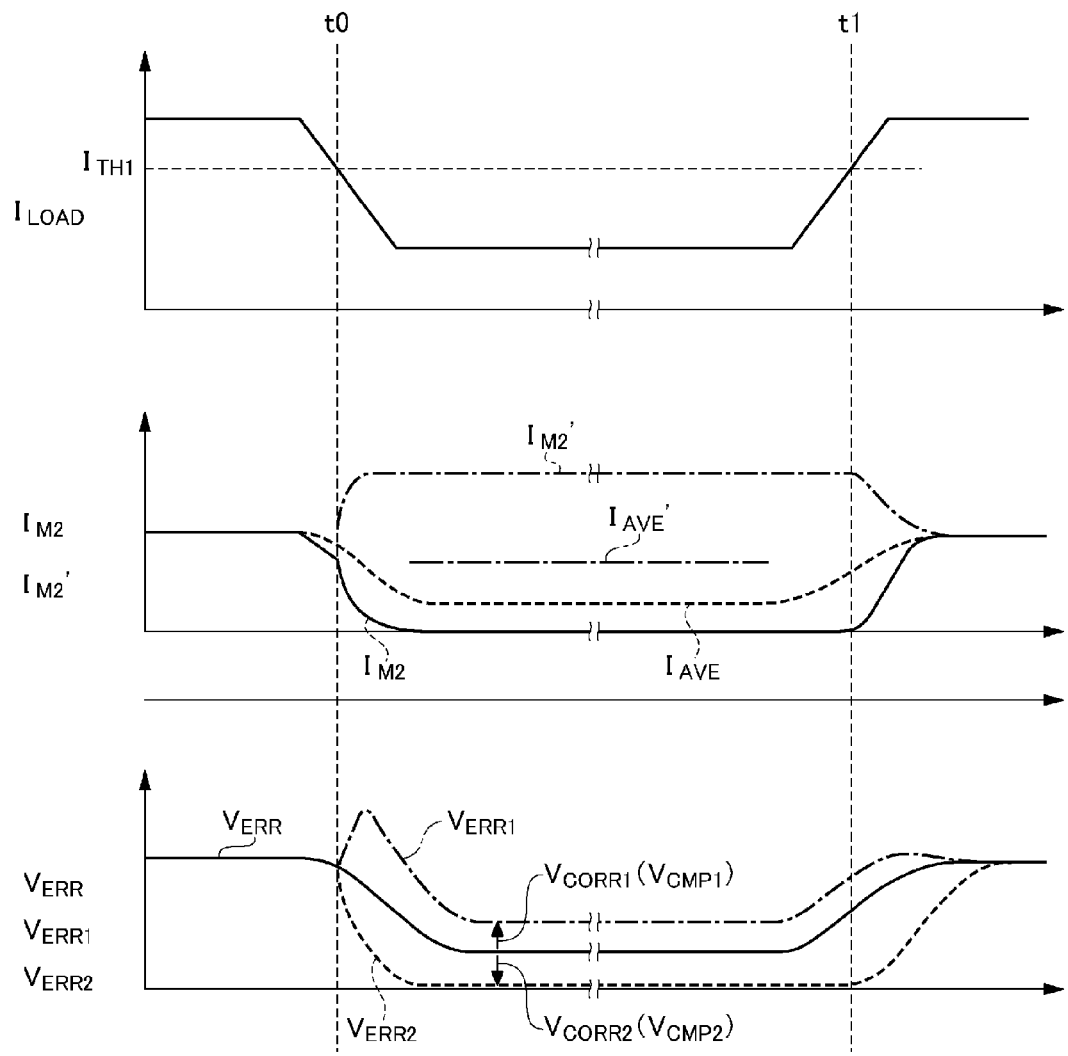
FIG. 9 is a waveform diagram showing a soft shedding operation provided by a current balance circuit.

FIG. 9 is a waveform diagram showing the soft shedding operation provided by the current balance circuit 220. The first-half region in FIG. 9 shows a switching operation of the DC/DC converter (having two channels, i.e., M=2) in which the number of enabled channels is reduced from 2 to 1, and the second-half region in FIG. 9 shows a switching operation in which the number of enabled channels is increased from 1 to 2. Before the time point t0, all the channels are set to the enabled state. Accordingly, the current balance circuit 220 is operated such that the current of each of all the channels approaches the average current $I_{AVE}$.

The average current $I_{AVE}$ is shown as a simple curve in the drawing. When the load current $I_{LOAD}$ drops at the time point t0, the current balance circuit 220 starts the operation as the soft shedding circuit 260. The internal state or otherwise the input state of the current balance circuit 220 is set assuming that a virtual current $I_{M2}'$ that is larger than the actual current $I_2$ flows through the second channel CH2. Accordingly, the current balance control operation is performed based on the virtual average current $I_{AVE}'$ that is larger than the actual average current $I_{AVE}$. As a result, the control operation is performed for the second channel CH2 such that the current $I_{M2}'$ that is larger than the average current $I_{AVE}'$ approaches the average current $I_{AvE}'$. Accordingly, the error signal $V_{ERR2}$ is gradually reduced, which gradually reduces the current $I_{M2}$ that flows through the second channel CH2. Furthermore, the current balance circuit 220 performs the current balance control operation for the first channel CH1. In this current balance control operation, the error signal $V_{ERR1}$ is adjusted, thereby adjusting the amount of current $I_{M1}$.

When the load current $I_{LOAD}$ rises at the time point t1, the current balance circuit 220 again starts the operation as the soft shedding circuit 260. Specifically, the current value of the second channel CH2 to be used is gradually returned from the virtual current value $I_{M2}'$ to the actual current value $I_{M2}$. As a result, the control operation is returned to the current balance control operation based on the actual average current $I_{AVE}$.

Figure 10:
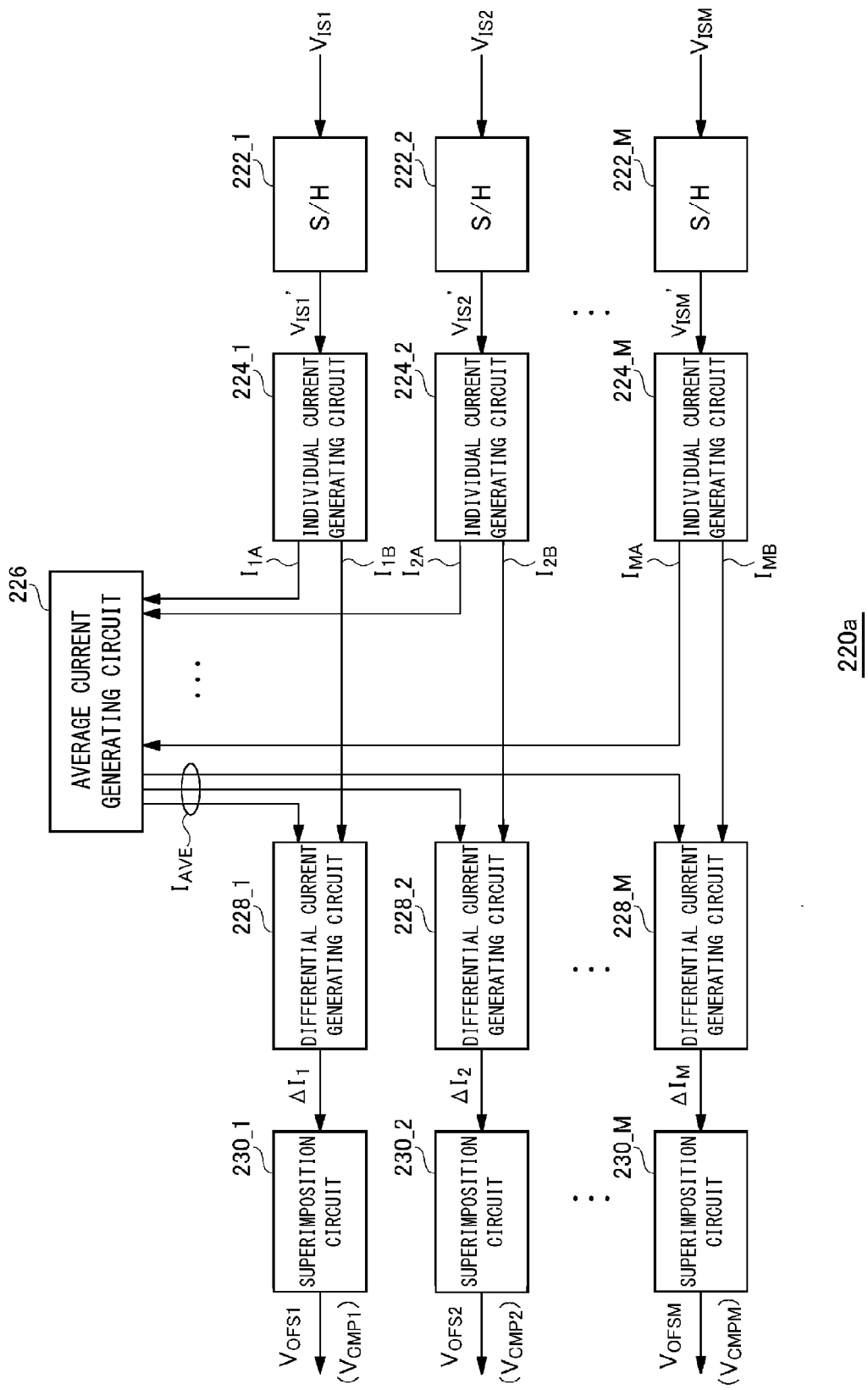
FIG. 10 is a circuit diagram showing an example configuration of the current balance circuit.

Next, description will be made regarding an example configuration of the current balance circuit 220 also having a function of operating as the soft shedding circuit 260. FIG. 10 is a circuit diagram showing an example configuration (220a) of the current balance circuit 220. The current balance circuit 220a includes multiple sample-and-hold circuits 222_1 through 222_M that respectively correspond to the multiple channels. The i-th sample-and-hold circuit 222_i performs a sampling operation for the corresponding current detection signal $V_{ISi}$ at a predetermined timing for every PWM period. For example, in a case in which the current balance control operation is performed such that the peaks of the coil currents $I_L$ matches each other as described above, the sample-and-hold circuit 222_i may preferably perform the sampling operation at a timing of the peak of the current detection signal $V_{ISi}$. The sampling timing may be generated based on a negative edge of the ICMP signal or otherwise a negative edge of the PWM signal $S_{PWM}$ of the corresponding channel. It should be noted that a track-and-hold circuit may be employed instead of such a sample-and-hold circuit.

It should be noted that the current balance control operation may be performed such that the bottoms of the coil currents of all the channels, i.e., the bottoms of the coil currents $I_{L1}$ through $I_{LM}$ match each other, instead of the current balance control operation performed such that the peaks of the coil currents of all the channels match each other. In this case, each sample-and-hold circuit 222_i may preferably perform the sampling operation at a bottom timing of the current detection signal $V_{ISi}$, i.e., at a timing immediately after the switching transistor M1 is turned on. For example, the sampling timing may be generated based on a positive edge of the PWM signal $S_{PWM}$.

The current balance circuit 220a further includes multiple individual current generating circuits 224_1 through 224_M, a current averaging circuit 226, multiple differential current generating circuits 228_1 through 228_M, and multiple superimposition circuits 230_1 through 230_M.

The multiple individual current generating circuits 224_1 through 224_M respectively correspond to the multiple channels CH1 through CHM. The i-th individual current generating circuit 224_i generates the individual current $I_i$ according to the corresponding current detection signal $V_{IS}$. The current averaging circuit 226 generates the average current $I_{AVE}$ that corresponds to an average of the respective individual currents $I_1$ through $I_M$ of the multiple channels CH1 through CHM.

$$I_{AVE}=(I_1+I_2+\ldots+I_M)/M$$

The multiple differential current generating circuits 228_1 through 228_M correspond to the multiple channels CH1 through CHM, respectively. The i-th differential current generating circuit 228_i generates a differential current $\Delta I_i$ between the corresponding individual current $I_i$ and the average current $I_{AVE}$. The differential current $\Delta I_i$ corresponds to the current deviation $\delta I_1$ in the waveform diagram shown in FIG. 5.

The multiple superimposition circuits 230_1 through 230_M correspond to the multiple channels CH1 through CHM, respectively. The i-th superimposition circuit 230_i superimposes, as the compensation signal $V_{CMPi}$, an offset voltage $V_{OFSi}$ that corresponds to the corresponding differential current $\Delta I_i$ on at least one of the non-inverting input terminal (+) and the inverting input terminal (−) of the corresponding PWM comparator 206.

In order to operate the current balance circuit 220a as the soft shedding circuit 260, the following control operation may be performed.

When any one of the individual current generating circuits 224_1 through 224_M corresponds to a disabled channel, the input $V_{IS}'$ to be input to the individual current generating circuit of the disabled channel may be set to or replaced by a value that differs from a feedback signal $V_{IS}$ that represents the actual current value. For example, in a case in which a converter having a configuration of M=2 is operated in a single-channel mode, a voltage (which will be referred to as the "dummy voltage $V_D$") as represented by $K \times I_{LOAD} \times R1$ may be supplied to the input of the individual current generating circuit 224_2.

Figure 11:
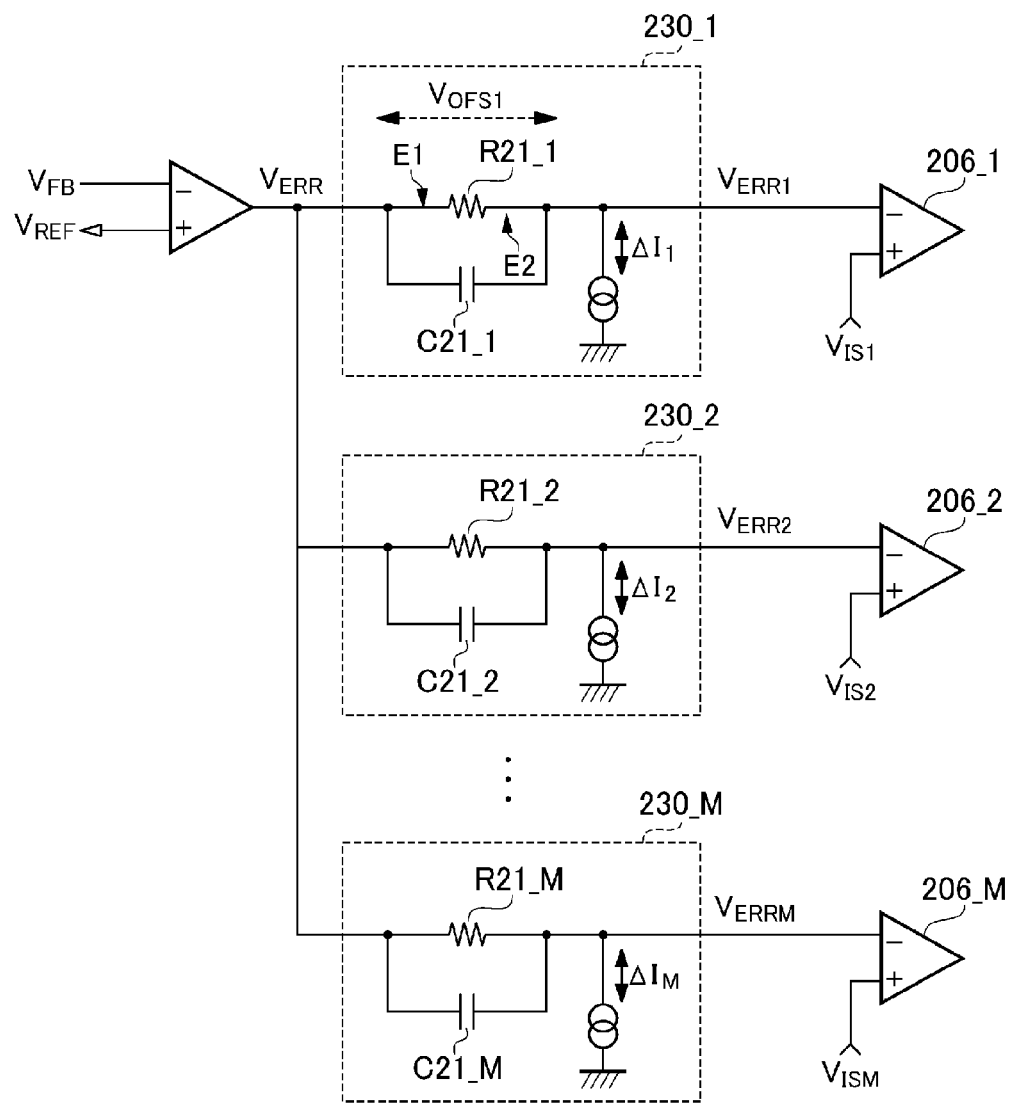
FIG. 11 is a circuit diagram showing an example configuration of a superimposition circuit.

FIG. 11 is a circuit diagram showing an example configuration of the superimposition circuit 230. The superimposition circuit 230_i includes an offset resistor R21_i and a third capacitor C21_i. Each offset resistor R21 is arranged such that its first end E1 is coupled to the output of the error amplifier 202 and its second end E2 is coupled to the inverting input terminal (−) of the corresponding PWM comparator 206_i. The third capacitor C2_i is coupled in parallel with the offset resistor R21_i. The superimposition circuit 230_i supplies the corresponding differential current $\Delta I_i$ to the second end of the offset resistor R21_i in the form of a source current or otherwise a sink current.

With such a superimposition circuit 230, the voltage at the inverting input terminal (−) of the PWM comparator 206 is represented by the following Expression (1).

$$V_{ERRi} = V_{ERR} + \Delta V_{OFSi} = V_{ERR} + R_{21} \times \Delta I_i \quad (1)$$

That is to say, such an arrangement is capable of independently superimposing, for each channel, a corresponding offset voltage $V_{OFSi}$, in proportion to the corresponding differential current $\Delta I_i$, on the common feedback voltage $V_{ERR}$. That is to say, each differential current $\Delta I_i$, which is supplied to the corresponding channel, does not have an effect on the original error signal $V_{ERR}$.

Furthermore, such an arrangement is capable of adjusting the gain of the current balance control operation according to the resistance value of each offset resistor R21. Moreover, such an arrangement is capable of adjusting the response speed of the current balance control operation according to the capacitance of the third capacitor C21. Moreover, when the current balance circuit 220 is operated as the soft shedding circuit 260, such an arrangement is capable of setting the time constant of the soft shedding control operation according to the capacitance of the capacitor C21.

Figure 12A:
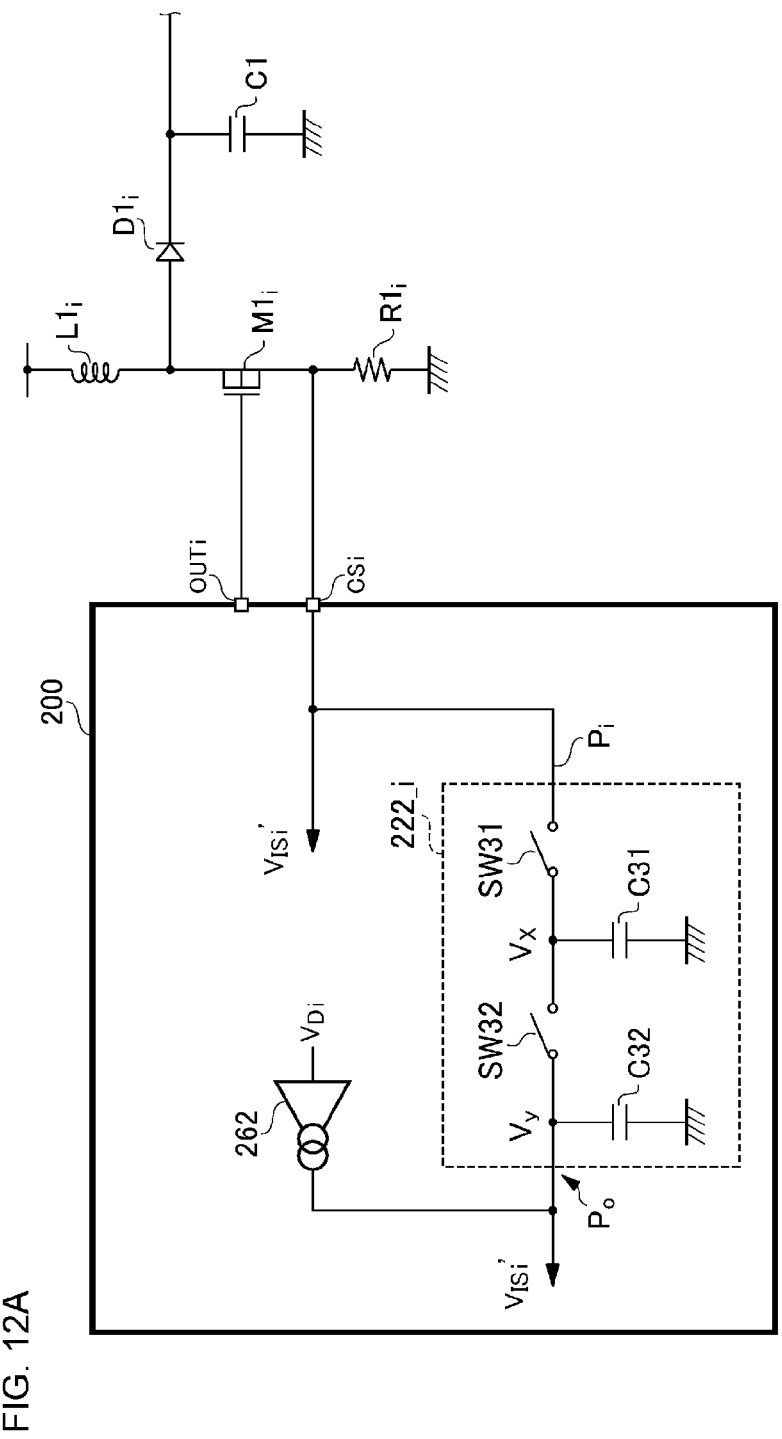
FIGS. 12A and 12B are circuit diagrams each showing an example configuration of a sample-and-hold circuit.
Figure 12B:
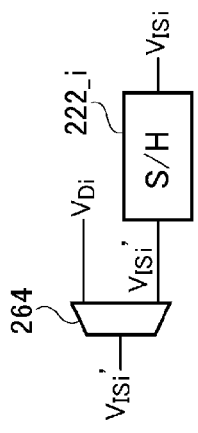

FIGS. 12A and 12B are circuit diagrams each showing an example configuration of the sample-and-hold circuit 222. The sample-and-hold circuit 222 is arranged such that its input terminal Pi is coupled to the CSi terminal so as to receive the current detection signal $V_{IS}$. A first switch SW31 and a second switch SW32 are arranged in series between the input terminal Pi and an output terminal Po. A first capacitor C31 is coupled to a connection node that couples the first switch SW31 and the second switch SW32. The second capacitor C32 is coupled to the output terminal Po.

In the configuration shown in FIG. 12A, as a component that relates to the operation as the soft shedding circuit 260, the control circuit 200 may include a voltage source (or current source or charger circuit) 262 that charges the second capacitor C32 such that the charge voltage reaches the dummy voltage $V_D$.

Alternatively, as shown in FIG. 12B, as the downstream stage of each sample-and-hold circuit 222, a selector 264 may be provided so as to switch the selected voltage between the dummy voltage $V_{Di}$ and the output voltage $V_{ISi}'$ of the sample-and-hold circuit 222.

Figure 13:
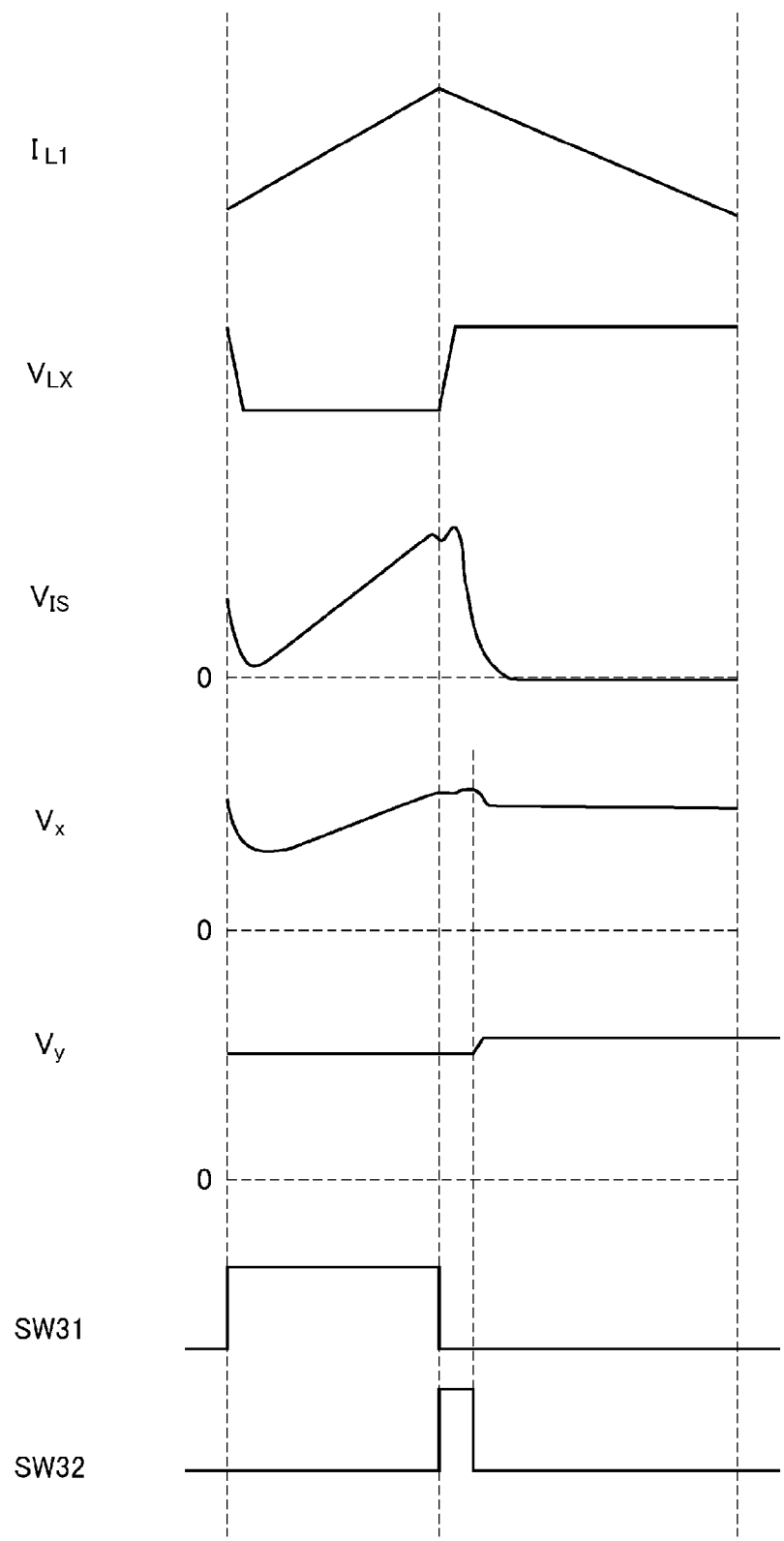
FIG. 13 is an operation waveform diagram showing the operation of the sample-and-hold circuit shown in FIG. 12.

FIG. 13 is an operation waveform diagram showing the operation of the sample-and-hold circuit 222 shown in FIG. 12. $V_{LX}$ represents the voltage at a connection node that couples the inductor L1 and the switching transistor M1 shown in FIG. 3. Vx represents the voltage across the first capacitor C31. Vy represents the voltage across the second capacitor C32. The gain and the time constant of the sample-and-hold circuit 222 can be designed according to the capacitance ratio between the first capacitor C31 and the second capacitor C32. That is to say, the gain and the response speed of the sample-and-hold circuit 222 can be raised according to a reduction in the capacitance of the second capacitor C32. However, in a case in which the sample-and-hold circuit 222 is provided with a very high gain, in some cases, this leads to degradation of system stability. In order to solve such a problem, by designing the sample-and-hold circuit 222 such that the second capacitor C32 has a larger capacitance than that of the first capacitor C31, such an arrangement provides both an appropriate gain and an appropriate time constant.

Figure 14:
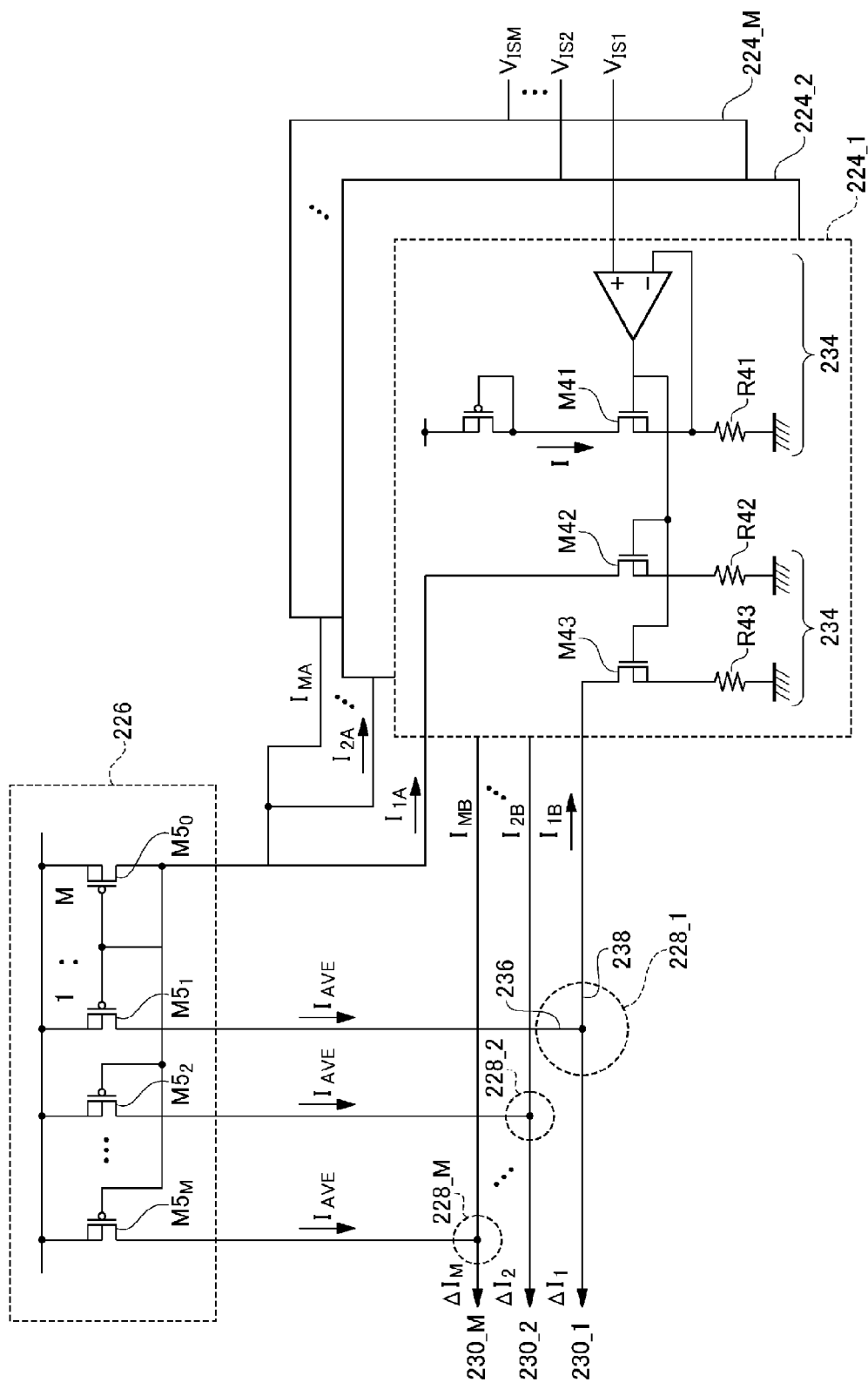
FIG. 14 is a circuit diagram showing an example configuration of an individual current generating circuit, a current averaging circuit, and a differential current generating circuit.

FIG. 14 is a circuit diagram showing example configurations of the individual current generating circuit 224, the current averaging circuit 226, and the differential current generating circuit 228. The multiple individual current generating circuits 224 have the same circuit configuration. Accordingly, description will be made regarding a first channel configuration. The individual current generating circuit 224_1 includes a V/I conversion circuit 232 and a current distributing circuit 234. The V/I conversion circuit 232 converts the corresponding current detection signal $V_{IS1}$ into a current signal $I_{1C}$. The configuration of the current conversion circuit 232 is not restricted in particular. That is to say, various kinds of known techniques may be employed. The current distributing circuit 234 duplicates the current signal $I_{1C}$ so as to provide a pair of equivalent currents via two respective lines. One of the equivalent currents, i.e., a current $I_{1A}$, is supplied to the current averaging circuit 226 via one line. The other equivalent current, i.e., a current $I_{1B}$, is supplied to the corresponding differential current generating circuit 228_1 via the other line.

For example, the current distributing circuit 234 may include transistors M42 and M43, each configured as a replica of the transistor M41 of the V/I conversion circuit 232, and resistors R42 and R43, each configured as a replica of the resistor R41 of the V/I conversion circuit 232. The transistors M41, M42, and M43 are arranged such that their gates are coupled so as to form a common gate. The configuration of the current distributing circuit 234 is not restricted in particular. The current distributing circuit 234 may be configured as a current mirror circuit.

The current averaging circuit 226 includes a current mirror circuit. The current mirror circuit includes an input transistor M50 and multiple output transistors M51 through M5M. The input transistor M50 receives, as its input signals, the respective individual currents $I_{1A}$ through $I_{MA}$ of the multiple channels CH1 through CHM. The size ratio between the input transistor M50 and each of the output transistors M51 through M5M is set to M:1. With such an arrangement, the average current $I_{AVE}$ flows through each of the multiple output transistors M51 through M5M.

The differential current generating circuit 228_i is configured as a connection node that connects a line 236 through which the average current $I_{AVE}$ flows, a line 238 through which the individual current $I_{iB}$ flows, and a line 240 that extends to the superimposition circuit 230. The differential current $\Delta I_i = I_{AVE} - I_{iB}$ flows through the line 240.

It should be noted that the configurations of the sample-and-hold circuit 222, the individual current generating circuit 224, the current averaging circuit 226, the differential current generating circuit 228, and the superimposition circuit 230 are not restricted in particular. That is to say, known circuit configurations may be employed as such components.

Figure 15:
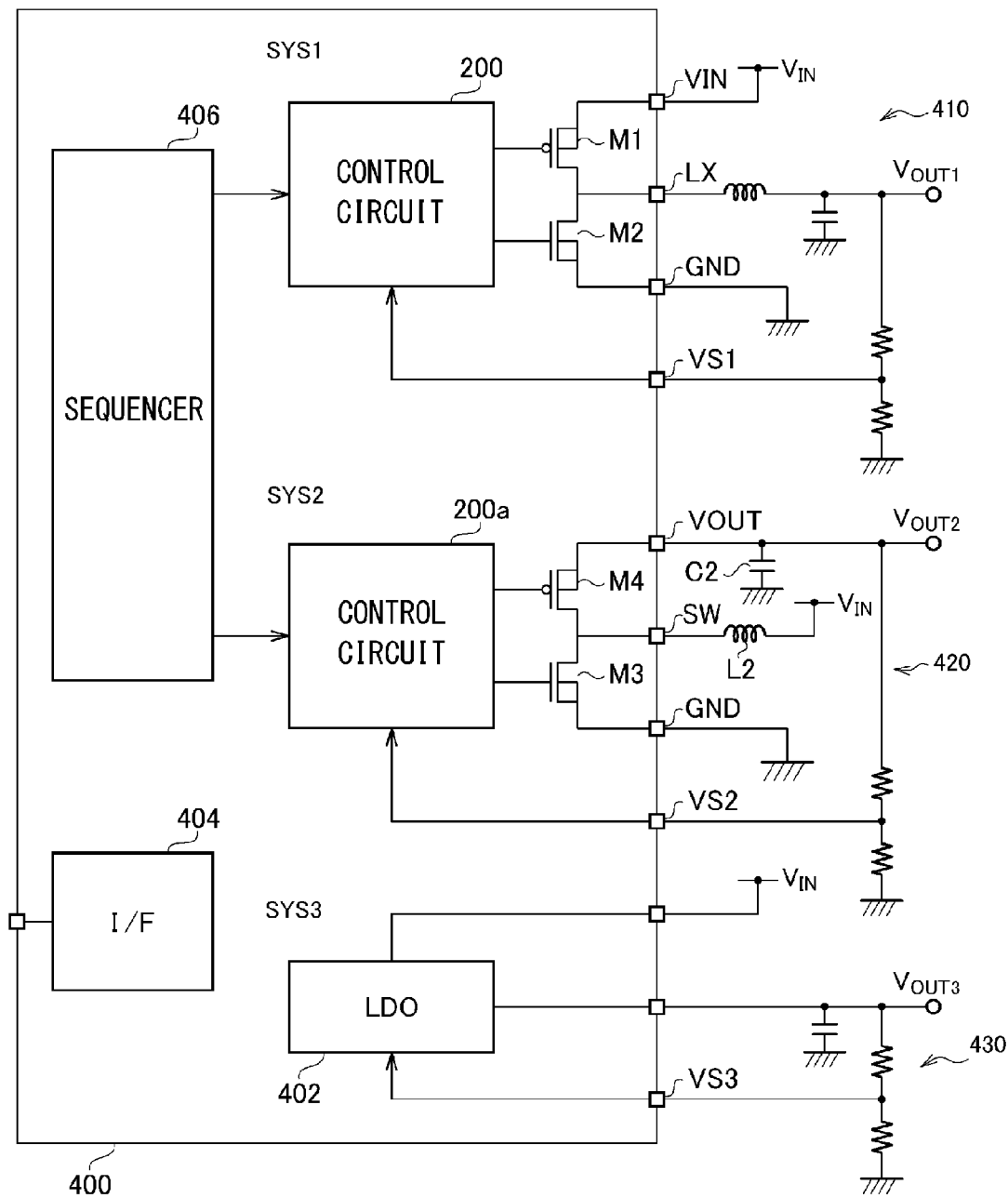
FIG. 15 is a block diagram showing a system power supply employing the DC/DC converter according to the embodiment.

Lastly, description will be made regarding an example usage of the DC/DC converter. FIG. 15 is a block diagram showing a system power supply employing the DC/DC converter according to the embodiment. A system power supply 300 has a multi-line configuration (a three-line configuration in the embodiment). The system power supply 300 generates various kinds of power supply voltages $V_{OUT}$ at respective lines SYS1 through SYS3, which can be supplied to various kinds of loads.

The system power supply 300 may include a desired combination of a step-down converter, a step-up converter, and a linear regulator. In FIG. 15, the first line SYS1 is configured as a step-down converter 410, the second line SYS2 is configured as a step-up converter 420, and the third line SYS3 is configured as a linear regulator (LDO: Low Drop Output) 430. Also, multiple linear regulators may be respectively provided for the multiple channels. The step-down converter 410 or otherwise the step-up converter 420 corresponds to the DC/DC converter 100 described above in the embodiment. FIG. 15 shows the DC/DC converter having a single-channel configuration. Also, such a DC/DC converter may have a multi-channel/multi-phase configuration.

The system power supply 300 includes a power management IC 400 and additional peripheral circuit components. The power management IC 400 includes the control circuit 200 for the step-down converter 410, the control circuit 200 for the step-up converter 420, a linear regulator 402, an interface circuit 404, a sequencer 406, and the like. In addition, the power management IC 400 includes various kinds of built-in components such as protection circuits.

The interface circuit 404 is provided in order to allow a control signal and data to be transmitted to and received from an external host processor. For example, the interface circuit 404 may conform to the I²C (Inter IC) BUS specification. The sequencer 406 controls the start-up sequence or start-up timing for the multi-line power supply circuit.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[First Modification]

The current balance circuit 220a shown in FIG. 10 may include an averaging circuit that generates an average value of the current detection signals $V_{IS}$ instead of the sample-and-hold circuits 222. Such an averaging circuit may be configured as a low-pass filter.

[Second Modification]

Description has been made in the embodiment regarding a diode rectification DC/DC converter. Also, the present invention is applicable to a synchronous rectification DC/DC converter. Also, the present invention is applicable to a step-down DC/DC converter and a step-up/step-down DC/DC converter. In this case, the topology of the output circuit 110 shown in FIG. 3 may preferably be modified.

[Third Modification]

In FIG. 3, the detection method for detecting the coil current $I_L$ is not restricted in particular. For example, the on resistance of the switching transistor M1 may be used instead of the current sensing resistor R1. Also, an additional transistor may be provided as a replica of the switching transistor M1 such that a current flows through the replica transistor in proportion to the current that flows through the switching transistor M1. With such an arrangement, the current that flows through the replica transistor may be detected.

[Fourth Modification]

Figure 16:
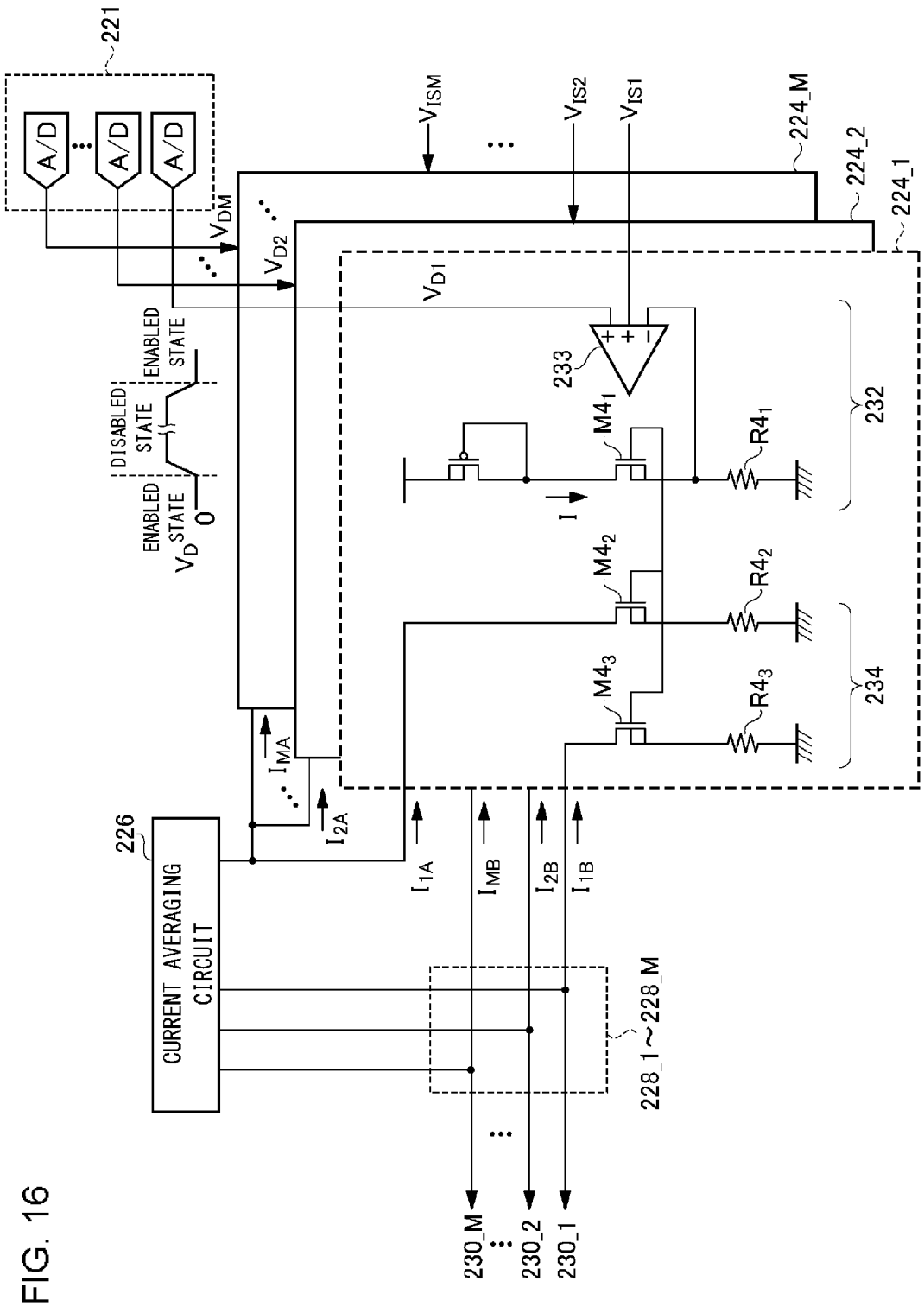
FIG. 16 is a circuit diagram showing a current balance circuit according to a fourth modification.

FIG. 16 is a circuit diagram showing a part of a current balance circuit 220 according to a fourth modification. The current balance circuit 220 further includes a dummy voltage generating unit 221 that generates the dummy voltage VD for each channel. When a given channel CHi is set to the disabled state, the dummy voltage generating unit 221 gradually raises the dummy voltage $V_D$ toward a predetermined value, following which the dummy voltage generating unit 221 maintains the predetermined value for a disabled period. When the channel CHi is set to the enabled state again, the dummy voltage generating unit 221 generates the dummy voltage $V_{Di}$ that is reduced toward zero. For example, the dummy voltage generating unit 221 may include an D/A converter, and may control the dummy voltage $V_{Di}$ in a digital manner.

The individual current generating circuit 224 has the same basic configuration as that shown in FIG. 14. In this modification, the operational amplifier 233 of the V/I conversion circuit 232 of each channel has two non-inverting input terminals. The corresponding current detection signal $V_{ISi}$ is input to one of the two non-inverting input terminals. The dummy voltage $V_{Di}$ is input to the other non-inverting input terminal. The operational amplifier 233 having such a three-input configuration amplifies a difference between the voltage input to its inverting input terminal and a higher voltage from among the voltages input to the two non-inverting input terminals.

During a period in which the relation $V_{Si} > V_{Di}$ holds true, the individual current generating circuit 224_i operates according to the current detection signal $V_{Si}$. Accordingly, in this period, the current balance circuit 220 operates in its primary function as a current balance circuit. During a period in which the relation $V_{Si} < V_{Di}$ holds true, the individual current generating circuit 224_i operates according to the dummy voltage $V_{Di}$. Accordingly, in this period, the current balance circuit 220 operates as a soft shedding circuit. Such a modification is capable of switching its operation state in a seamless manner between the current balance control operation state, which is a normal state, and the soft shedding control operation state. Furthermore, such a modification does not require the hold circuit 222 and the selector 264, and provides the soft shedding control operation in a digital manner.

As a yet another modification, the dummy voltage generating unit 221 shown in FIG. 16 may include a capacitor, a current source that charges the capacitor so as to generate a rising slope of the dummy voltage $V_D$, and a current source that discharges the capacitor so as to generate a falling slope of the dummy voltage $V_D$.

While the preferred embodiments of the present invention have been described using specific terms, such description is for illustrative purposes only, and it is to be understood that changes and variations may be made without departing from the spirit or scope of the appended claims.

What is claimed is:

1. A control circuit for a multi-channel DC/DC converter, wherein the DC/DC converter comprises, for each channel, a switching transistor, an inductor, and a rectifier element, and wherein the control circuit comprises:
   an error amplifier structured to amplify a difference between a feedback signal that corresponds to an output signal of the DC/DC converter and a target value thereof so as to generate an error signal;
   a plurality of peak current mode pulse width modulators that respectively correspond to the plurality of channels, each of which comprises a comparator structured to compare the error signal with a current detection signal that represents a current that flows through the corresponding switching transistor, and a logic circuit structured to switch a PWM (Pulse Width Modulation) signal to an off level according to an output of the comparator;
   a plurality of drivers that respectively correspond to the plurality of channels, each of which is structured to drive the corresponding switching transistor according to the corresponding PWM signal; and
   a soft shedding circuit structured such that, when a number of enabled channels is switched, at least one channel is set to a correction target channel, a correction signal is generated for each correction target channel, and the correction signal thus generated is superimposed on at least one of two inputs of the corresponding comparator.

2. The control circuit according to claim 1, wherein the soft shedding circuit is structured to superimpose the corresponding correction signal on the error signal side input for each correction target channel.

3. The control circuit according to claim 1, wherein the soft shedding circuit is structured such that, when the number of enabled channels is reduced, the correction signal is superimposed on the channels to be disabled after the channel switching, with a duty ratio that drops with time.

4. The control circuit according to claim 1, wherein the soft shedding circuit is structured such that, when the number of enabled channels is increased, the correction signal is superimposed on the channels to be newly enabled, with a duty ratio that rises from zero.

5. The control circuit according to claim 1, further comprising a current balance circuit structured to superimpose, for each of the plurality of channels, a compensation signal that corresponds to a difference between the corresponding current detection signal and an average value of the current detection signals of the plurality of channels on at least one of the two inputs of the corresponding comparator,
   and wherein, when at least one of the channels is set to a disabled state, the current balance circuit operates assuming that a current flows through each of all the channels, so as to function as the soft shedding circuit.

6. The control circuit according to claim 5, wherein, when the current balance circuit is operated as the soft shedding circuit, the current detection signal to be supplied to the disabled channel is set to or otherwise replaced by a non-zero value that differs from an actual value.

7. The control circuit according to claim 5, wherein the current balance circuit comprises:
   a plurality of individual current generating circuits that respectively correspond to the plurality of channels, and each of which is structured to generate an individual current according to the corresponding current detection signal;
   a current averaging circuit structured to generate an average current that corresponds to an average of the individual currents of the plurality of channels;
   a plurality of differential current generating circuits that respectively correspond to the plurality of channels, and each of which is structured to generate a differential current between the corresponding individual current and the average current; and
   a plurality of superimposition circuits that respectively correspond to the plurality of channels, and each of which is structured to generate an offset voltage as a compensation signal according to the corresponding differential current, and to superimpose the offset voltage thus generated on at least one of two inputs of the corresponding comparator.

8. The control circuit according to claim 7, wherein the current balance circuit further comprises a dummy voltage generating unit structured to generate dummy voltages to be respectively supplied to the plurality of channels,
   and wherein the plurality of individual current generating circuits are each structured to generate the individual current based on a higher voltage from among the corresponding current detection signal and the corresponding dummy voltage.

9. The control circuit according to claim 7, wherein the plurality of superimposition circuits each comprise an offset resistor arranged such that a first end thereof is coupled to an output of the error amplifier and a second end thereof is coupled to an input of the corresponding comparator,
   and wherein each superimposition circuit is structured to supply the corresponding differential current to the second end of the offset resistor in the form of a source current or otherwise a sink current.

10. The control circuit according to claim 7, wherein the plurality of individual current generating circuits each comprise:
    a voltage/current conversion circuit structured to convert the corresponding current detection signal to a current signal; and
    a current distributing circuit structured to duplicate the current signal so as to provide two lines with duplicated currents, to supply one of the duplicated currents to the current averaging circuit via one line, and to supply the other of the duplicated currents to the corresponding differential current generating circuit via the other line.

11. The control circuit according to claim 7, wherein the current averaging circuit comprises a current mirror circuit comprising an input transistor and output transistors,
    wherein, with the number of channels as M, the input transistor and each output transistor are designed such that a size ratio between them is set to M:1,
    wherein the individual currents of the plurality of channels are input to the input transistor,
    and wherein a current that flows through the output transistor is output as the average current.

12. The control circuit according to claim 6, wherein the current balance circuit comprises a plurality of hold circuits that respectively correspond to the plurality of channels, and each of which is structured to hold the corresponding current detection signal,
    and wherein, when the current balance circuit is operated as the soft shedding circuit, a hold value held by the hold circuit that corresponds to a disabled channel is set to or otherwise replaced by a non-zero value.

13. The control circuit according to claim 1, monolithically integrated on a single semiconductor substrate.

14. A DC/DC converter comprising the control circuit according to claim 1.

15. A system power supply comprising the DC/DC converter according to claim 14.

16. A control circuit for a multi-channel DC/DC converter, wherein the DC/DC converter comprises, for each channel, a switching transistor, an inductor, and a rectifier element, and wherein the control circuit comprises:
- an error amplifier structured to amplify a difference between a feedback signal that corresponds to an output voltage of the DC/DC converter and a target value thereof so as to generate an error signal;
- a plurality of peak current mode pulse width modulators that respectively correspond to the plurality of channels, each of which comprises a comparator structured to compare the error signal with a current detection signal that represents a current that flows through the corresponding switching transistor, and a logic circuit structured to switch a PWM (Pulse Width Modulation) signal to an off level according to an output of the comparator;
- a plurality of drivers that respectively correspond to the plurality of channels, each of which is structured to drive the corresponding switching transistor according to the corresponding PWM signal;
- a multi-phase controller structured to switch a number of enabled channels; and
- a current balance circuit structured to superimpose, for each of the plurality of channels, a compensation signal that corresponds to a difference between the corresponding current detection signal and an average value of the current detection signals of the plurality of channels on at least one of the two inputs of the corresponding comparator, and wherein, when at least one of the channels is set to a disabled state, the current balance circuit operates assuming that a current flows through each of all the channels.

17. A control method for a multi-phase DC/DC converter, wherein the DC/DC converter comprises, for each channel, a switching transistor, an inductor, and a rectifier element, and wherein the control method comprises:
- amplifying a difference between a feedback signal that corresponds to an output voltage of the DC/DC converter and a target value thereof so as to generate an error signal;
- comparing, for each channel, the error signal with a current detection signal that represents a current that flows through the corresponding switching transistor;
- generating a PWM (Pulse Width Modulation) signal that is switched to an off level according to result obtained in the comparison;
- driving, for each channel, the corresponding switching transistor according to the corresponding PWM signal;
- generating an average value of the respective current detection signals of the plurality of channels;
- superimposing, for each channel, a compensation signal generated according to a difference between the corresponding current detection signal and the average value, on at least one of the current detection signal and the error signal in the comparison; and
- generating the compensation signal assuming that a current flows through each of all the channels when at least one channel is set to a disabled state.

* * * * *